(12) United States Patent
Matiash

(10) Patent No.: US 7,531,768 B2
(45) Date of Patent: May 12, 2009

(54) WIRE FEEDER PINCH FORCE MECHANISM

(75) Inventor: Nicholas A. Matiash, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 116 days.

(21) Appl. No.: 11/050,982

(22) Filed: Feb. 4, 2005

(65) Prior Publication Data

US 2005/0224486 A1  Oct. 13, 2005

Related U.S. Application Data

(63) Continuation-in-part of application No. 10/820,996, filed on Apr. 8, 2004, and a continuation-in-part of application No. 10/820,997, filed on Apr. 8, 2004.

(51) Int. Cl.
*B23K 9/12* (2006.01)
*B65H 20/00* (2006.01)
*B65H 57/04* (2006.01)

(52) U.S. Cl. .................. 219/137.2; 226/177; 226/181; 226/187; 242/615.3

(58) Field of Classification Search ............. 219/137.2, 219/137.7; 226/177, 181, 186, 187; 242/615.3
See application file for complete search history.

(56) References Cited

U.S. PATENT DOCUMENTS

| 2,272,158 | A | 2/1942 | Anderson |
|---|---|---|---|
| 2,754,958 | A | 7/1956 | Murrell et al. |
| 2,904,168 | A | 9/1959 | Wall et al. |
| 2,906,913 | A | 9/1959 | Catlett |
| 3,016,451 | A | 1/1962 | Cornell, Jr. |
| 3,046,438 | A | 7/1962 | Elseth |
| 3,107,291 | A | 10/1963 | Evans et al. |
| 3,279,669 | A | 10/1966 | Bernard et al. |
| 3,331,545 | A | 7/1967 | Olivieri |
| 3,344,305 | A | 9/1967 | Ogden |
| 3,430,832 | A | 3/1969 | Meyer |
| 3,447,305 | A | 6/1969 | Stahlecker et al. |
| 3,447,730 | A | 6/1969 | Jeannette |
| 3,629,547 | A | 12/1971 | Kester et al. |

(Continued)

FOREIGN PATENT DOCUMENTS

DE  22920227 U1  1/2000

(Continued)

OTHER PUBLICATIONS

Miller Electric Mfg. Co., S-52A, S-54A Owner's Manual, Oct. 1991, 40 pgs., USA.

(Continued)

*Primary Examiner*—Kevin P Kerns
(74) *Attorney, Agent, or Firm*—Boyle Fredrickson, S.C.

(57) ABSTRACT

A wire pinch force mechanism has a drive assembly which includes at least a first drive roll and a second drive roll adapted and configured to drive a weld wire. The pinch force mechanism further includes a cover movable between a first relatively open position and a second relatively closed position; and a force converter, mounted to the cover, which communicates with and applies an adjustable force to the drive assembly.

11 Claims, 19 Drawing Sheets

U.S. PATENT DOCUMENTS

| | | | | |
|---|---|---|---|---|
| 3,675,837 | A * | 7/1972 | Gerould | 226/187 |
| 3,847,287 | A | 11/1974 | Dinse | |
| 3,901,425 | A | 8/1975 | Taylor et al. | |
| 4,068,106 | A | 1/1978 | Shaputis | |
| 4,143,257 | A | 3/1979 | Herrmann | |
| 4,160,151 | A | 7/1979 | Tonita | |
| 4,165,829 | A | 8/1979 | Koveshnikov et al. | |
| 4,177,912 | A | 12/1979 | Samokovliski et al. | |
| 4,206,862 | A | 6/1980 | DaCosta | |
| 4,210,796 | A | 7/1980 | Moerke | |
| 4,261,499 | A | 4/1981 | Samokovliski et al. | |
| 4,261,500 | A | 4/1981 | Samokovliski et al. | |
| 4,344,553 | A | 8/1982 | Lesher et al. | |
| 4,429,820 | A | 2/1984 | Angelov et al. | |
| 4,442,334 | A | 4/1984 | Lux et al. | |
| 4,549,068 | A | 10/1985 | Kensrue | |
| 4,600,824 | A | 7/1986 | Moerke | |
| 4,650,959 | A | 3/1987 | Swensrud et al. | |
| 4,695,702 | A | 9/1987 | Gartland | |
| 4,845,336 | A | 7/1989 | Samokovliiski et al. | |
| 4,864,099 | A | 9/1989 | Cusick, III et al. | |
| 5,338,917 | A | 8/1994 | Stuart et al. | |
| 5,738,264 | A | 4/1998 | Jackson et al. | |
| 5,816,466 | A * | 10/1998 | Seufer | 226/187 |
| 6,066,833 | A * | 5/2000 | Rigdon et al. | 219/137.2 |
| 6,257,517 | B1 | 7/2001 | Babish et al. | |
| 6,318,614 | B1 | 11/2001 | Boyd | |
| 6,365,867 | B1 | 4/2002 | Hooper | |
| 6,388,234 | B1 | 5/2002 | Collins et al. | |
| 6,427,894 | B1 | 8/2002 | Blank et al. | |
| 6,525,297 | B2 | 2/2003 | Doherty | |
| 6,536,644 | B2 | 3/2003 | Plow | |
| 6,557,742 | B1 | 5/2003 | Bobeczko et al. | |
| 6,568,578 | B1 * | 5/2003 | Kensrue | 226/176 |
| 6,903,305 | B2 * | 6/2005 | Mukai et al. | 219/137.7 |
| 7,026,574 | B2 * | 4/2006 | Belfiore et al. | 219/137.7 |
| 2005/0006425 | A1 | 1/2005 | Enyedy | |

FOREIGN PATENT DOCUMENTS

WO    WO 01/66297    9/2001

OTHER PUBLICATIONS

Miller Electric Mfg. Co., 22A, 24A Owner's Manual, Oct. 2003, 28 pgs., USA.

Miller Electric Mfg. Co., S-74DX Owner's Manual, Nov. 2003, 40 pgs., USA.

* cited by examiner

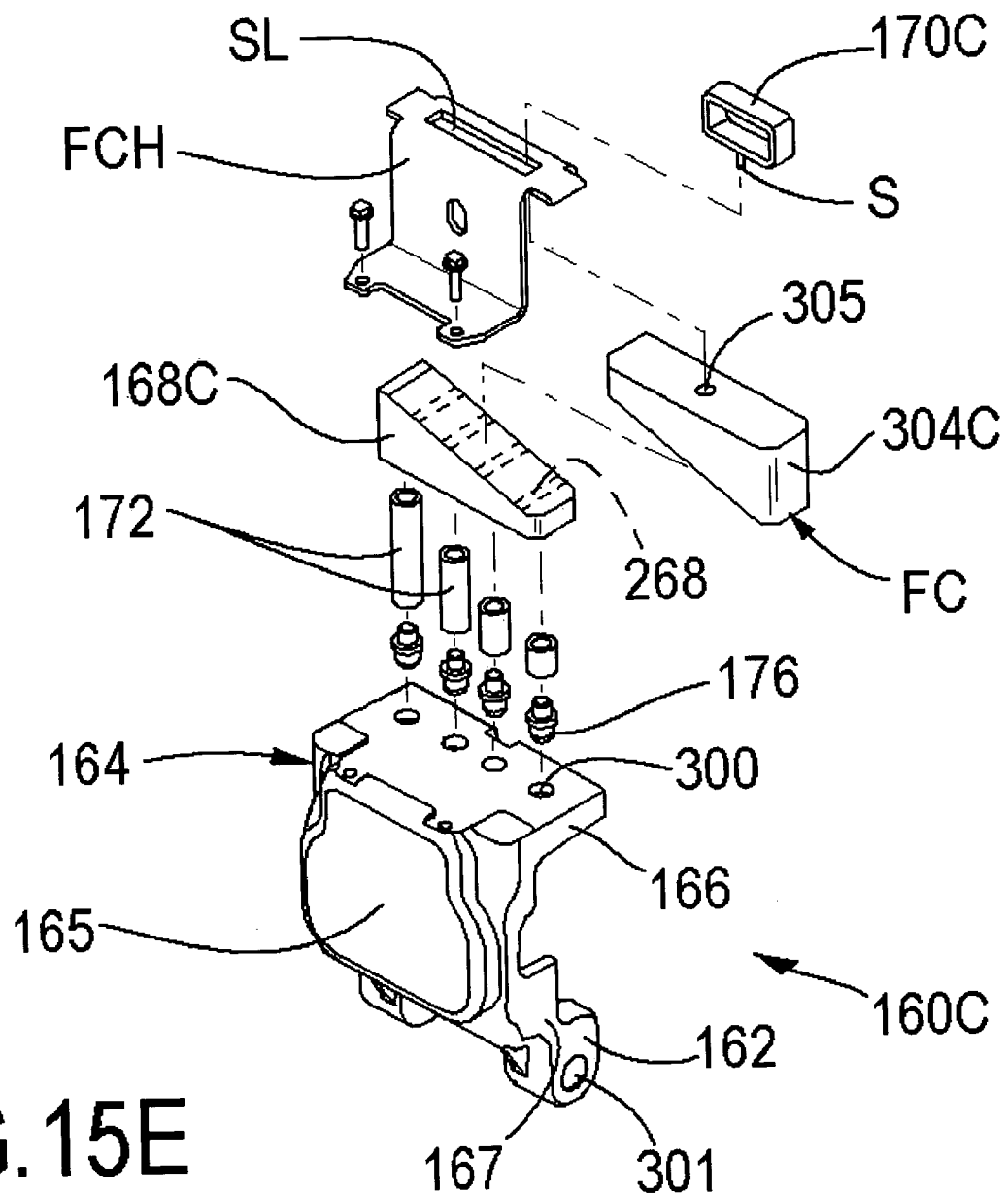

WIRE FEEDER PINCH FORCE MECHANISM

CROSS-REFERENCE TO RELATED APPLICATIONS

This application is a Continuation-in-Part application claiming priority under 35 U.S.C. 120 to U.S. application Ser. No. 10/820,996, filed Apr. 8, 2004, and U.S. application Ser. No. 10/820,997, filed Apr. 8, 2004, both of which are incorporated by reference in their entireties.

BACKGROUND

The present invention relates generally to welding systems, and more particularly, to apparatus for feeding welding wire in welding systems.

An important part of welding systems is the mechanism that feeds an electrode wire, a filler-material wire, or other weld wire to the work piece. Weld wires range in size and in material composition. Typically, weld wires range in size from approximately 0.023 inch in diameter to approximately 0.052 inch in diameter and can be as large as approximately 0.250 inch in diameter, and include material compositions of steel, stainless steel, aluminum, and/or other materials.

As used herein, the phrase "wire feeder assembly" includes a spool of weld wire, a drive assembly, any gun liner, and any other support or control apparatus along the path of travel of the wire between the spool and the contact tip of the gun, including the electronic controls.

Wire feeder assemblies generically comprehend electrode wire feeders used in e.g. Gas Metal Arc Welding (GMAW) in which the electrode wire is fed as part of the welding circuit and melts to become part of the weld deposit/pool. Wire feeder assemblies also include cold wire feeders used in e.g. Gas Tungsten Arc Welding (GTAW) and laser welding in which the filler-material wire is fed into, and melts from the heat of, the weld pool and thus becomes part of the weld pool.

In addition, wire feeder assemblies and/or components thereof can be used to drive materials other than weld wire, such materials typically having generally physically similar characteristics and/or properties to those of weld wire.

The drive assembly typically includes an electric motor which drives a rotationally-driven drive roll, which cooperates with a corresponding pressure roll. Both the rotationally-driven drive roll and the pressure roll, e.g. a pressure drive roll, cooperate in driving the weld wire. The rotationally-driven drive roll and the pressure drive roll have outer circumferential surfaces, at least one of the drive roll and pressure drive roll having a groove formed therein sized and configured to accept a weld wire having a particular diameter, between the cooperating drive rolls.

The pressure drive roll applies lateral pressure against the weld wire and correspondingly against the rotationally-driven drive roll. When the electric motor is energized, it rotationally drives the rotationally-driven drive roll which, in cooperation with the pressure drive roll, advances the weld wire through the liner and contact tip in the welding gun, and into the weld pool.

The drive assembly can jam if the weld wire strays from the desired feed path which extends through the e.g. nip which is defined between the upper and lower drive rolls. Wire jams can be caused when the weld wire collapses as the compressive columnar strength of the weld wire is exceeded, whereupon the weld wire becomes bunched up, tangled, wrapped around drive rolls, or other components in the drive assembly, or otherwise travels along a non-desired path or deviates from the desired path. In any case, such deviant wire travel is sometimes referred to as e.g. "bird's nesting."

"Bird's nesting" normally occurs in an area in which the weld wire is unsupported, and typically happens when the weld wire drag, or resistance to movement through the liner, combines with the weld wire driving force applied by the drive rolls to overcome the columnar strength of the wire. When the columnar strength is exceeded, the weld wire ceases movement through the conduit, and piles up in the area of collapse, or travels along a non-desired path until the electric motor driving the drive rolls ceases its drive action.

"Bird's nesting" consumes operator/user time, requiring such operator/user to open the drive assembly and to untangle and/or otherwise clear the wire jam, and re-feed the weld wire along the wire drive path.

It is not desirable to have an operator/user opening the drive assembly more often than necessary, as many welding operations are performed in rather harsh environments and dirt and/or other debris frequently found in such welding environments can eventually become lodged in e.g. the liner of the weld gun, which further compromises the travel of the weld wire to the workpiece.

When a wire jam occurs, the weld wire does not advance through the liner and contact tip of the welding gun. Thus the weld wire which extends beyond the contact tip is consumed without a new portion of the weld wire advancing to replace the consumed portion. This phenomenon is commonly referred to as "burn-back" and can result in the weld wire melting into, and thus becoming welded to, the contact tip of the gun. In the event where the weld wire becomes welded to the contact tip, the operator/user typically must install a new contact tip before proceeding with any more welding operations.

As weld wire is advanced along either a desired path e.g. out a welding gun or along a non-desired path such as "bird's nesting," the weld wire can be energized by a welding power source. Accordingly, if the deviant weld wire comes into electrical contact with e.g. the electric motor of the drive assembly, the integrity of the electric motor can be compromised. Also, since such advancing weld wire is electrically "live," a weld wire which advances along a non-desired path, for example outwardly of the drive assembly, can pose safety hazards for the operator and/or any persons near such activity.

Some weld wires are generally more susceptible to "bird's nesting" than other weld wires. As one example, aluminum weld wires are more susceptible to traveling along a non-desired path than are steel weld wires because aluminum has a relatively lower columnar strength and a relatively more easily deformable cross section, and/or relatively more malleable.

Numerous approaches of dealing with "bird's nesting" problems in wire feeders have been attempted, including use of TEFLON, and relatively shorter liners in weld guns, and use of weld wire spool guns which are weld guns that house and drive a spool of weld wire in the gun itself rather than having the weld wire spool mounted in combination with a control box. However, it is sometimes desirable to use a weld gun which has a relatively long liner to enable an operator/user to weld at a point relatively distant from the weld wire feeder apparatus. In addition, weld wire spool guns are bulky in comparison to typical weld guns and accordingly can be relatively cumbersome to operate. Further, an operator/user may desire to weld with a spool of weld wire which is larger than that which can be housed in a weld wire spool gun, e.g. it may be desirable to use a 12 inch spool of weld wire instead of a 4 inch spool.

It is desirable, therefore, to improve weld wire feeder assemblies to provide more support for a weld wire in areas of the feeder assemblies in which a weld wire is typically unsupported. In addition, it is desirable to improve weld wire feeder assemblies to provide a relatively more consistent, and relatively more desirably distributed, pressure to a weld wire.

Another problem with typical weld wire feeder assemblies is that service and repair of the drive assembly can be difficult, especially in the field. As one example, weld wire feeder assemblies having two drive mechanisms typically require at least some different components for e.g. left and right drive assemblies, which require storage of corresponding piece-parts for each of the left and right drive assemblies.

As another example of needed improvements, changing drive rolls in some drive assemblies requires tools. Certain known "tool-less" drive assembly designs require a dexterous manipulation of one or more components of the drive assembly.

Therefore, it is also desirable to provide weld wire feeder assemblies which are easily serviced and/or repaired and which have drive assembly components which are common to both left and right drive assemblies, and methods and apparatus which facilitates easy removal and/or changing of drive rolls, other components, or consumable components, without using tools.

It is also desirable to provide drive assemblies which require a cover to be closed over the internal components before operation of the drive assembly, which increases the probability of achieving a relatively clean operational environment within the drive assembly. It is also desirable to provide drive assemblies which have a force converter, for applying a force to a drive assembly, attached to a cover which generally covers components of the drive assembly.

It is also desirable to provide re-designed drive assemblies which impede the development of "bird's nesting," and which facilitate the travel of the weld wire along the desired path.

SUMMARY

A wire pinch force mechanism has a drive assembly which includes at least a first drive roll and a second drive roll adapted and configured to drive a weld wire. The pinch force mechanism further includes a cover movable between a first relatively open position and a second relatively closed position; and a force converter, mounted to the cover, which communicates with and applies a variable force to the drive assembly.

In a first family of embodiments, the invention comprehends a wire pinch force mechanism comprising a drive assembly which includes at least a first drive roll and a second drive roll adapted and configured to drive a weld wire. The pinch force mechanism further includes at least one swingarm which is pivotable along a generally arcuate pivot path. Each of the first and second drive rolls are rotatable about a respective axis of rotation which is generally perpendicular to the pivot path. At least one of the first and second drive rolls is rotatably mounted to the at least one swingarm. A movable cover is movable between a first relatively open position and a second relatively closed position. A force converter is mounted to the cover, and communicates with and applies a force to the drive assembly.

In some embodiments, the wire pinch force mechanisms includes at least one biasing member which biasingly actuates along a generally straight line, vertical, axis.

In some embodiments, the wire pinch force mechanism a force converter mounted to the cover, which communicates with and applies a force to the drive assembly, the force converter having at least one pressure arm movable along a generally linear and generally linear travel path. In such embodiments, (i) when the pressure arm is relatively nearer to the drive assembly, the force converter applies a relatively greater magnitude force to the drive assembly, and (ii) when the pressure arm is relatively further from the drive assembly, the force converter applies a relatively lesser magnitude force to the drive assembly.

BRIEF DESCRIPTION OF THE DRAWINGS

FIG. 15E shows an enlarged exploded view of a third embodiment of cover assemblies of the present invention.

Figure 1:
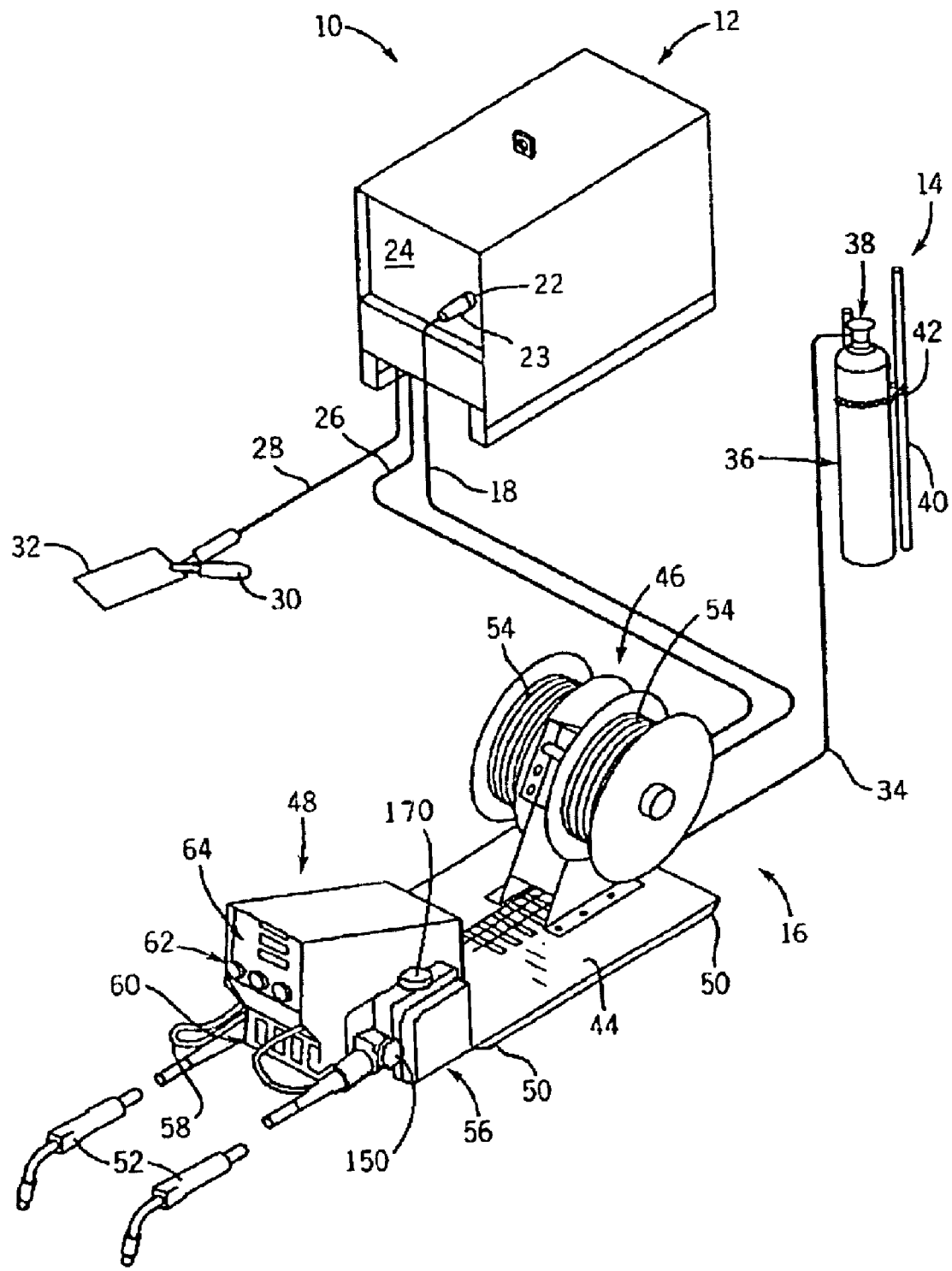
FIG. 1 shows a perspective view of a first embodiment of a welding system which includes a wire feeder assembly of the present invention.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

While the present invention is illustrated with reference to a particular welding wire feeder assembly having a particular configuration and particular features, the present invention is not limited to this configuration or to these features, and other configurations and features can be used.

Similarly, while the disclosure hereof is detailed and exact to enable those skilled in the art to practice the invention, the invention is embodied in other structures in addition to the illustrated exemplary structures. The scope of the invention is defined in the claims appended hereto.

Referring now to FIG. 1, a welding system 10 comprises a power source 12, a gas supply 14, and a wire feeder assembly 16. Preferably, power source 12 is a constant voltage welding power source which supplies welding arc power, and 24 VAC control power, to wire feeder 16. Wire feeder assembly 16 is electrically connected to the power source 12 via control cable 18 which carries the 24 VAC control power. Cable 18 includes a control output pin 23 which engages a corresponding nut 22 on the front panel 24 of power source 12. Also connected between power source 12 and wire feeder assembly 16 is weld cable 26. Weld cable 26 can be either a positive weld cable or a negative weld cable, depending upon the particular welding process. Hereinafter, however, cable 26 is described as a positive weld cable. As such, a negative weld cable 28 also extends from the power source 12. Negative weld cable 28 extends from power source 12 to a clamping member 30 which is adapted and configured to be attached to workpiece 32. Since positive weld cable 26 extends to wire feeder assembly 16, and negative weld cable 28 extends to workpiece 32, the requisite voltage potential between the wire feeder assembly and workpiece, necessary for welding, is achieved.

Also connected to wire feeder assembly 16 is a gas hose 34 which supplies gas for the arc-welding process, from gas cylinder 36. Gas cylinder 36 includes a regulator and flow meter 38 and, in the embodiment illustrated in FIG. 1, is securely positioned against structure 40 via chain 42.

Wire feeder assembly 16 includes a base plate 44 which is configured to support wire feed spindles 46 and control box 48. On the undersurface of base plate 44 are a number of rubber feet 50 which help to limit sliding of wire feeder assembly 16, as is described hereinafter with respect to FIG. 2. In the Illustrated embodiment, wire feeder assembly 16 includes first and second welding guns 52 which are supplied with weld wire, which is initially stored on wire feed spindles 46, by corresponding drive assembly 56. Each drive roller assembly 56 is connected to control box 48 by electrical leads 58.

Control box 48 includes a number of controls 60 which are used by the welder operator in conducting the welding operation. The switches which are indicated in controller 60 include jog/purge push buttons and an ON/OFF switch (not shown). Additional controls 62 include knobs which control the wire speed and a left/right switch 64.

Figure 2:
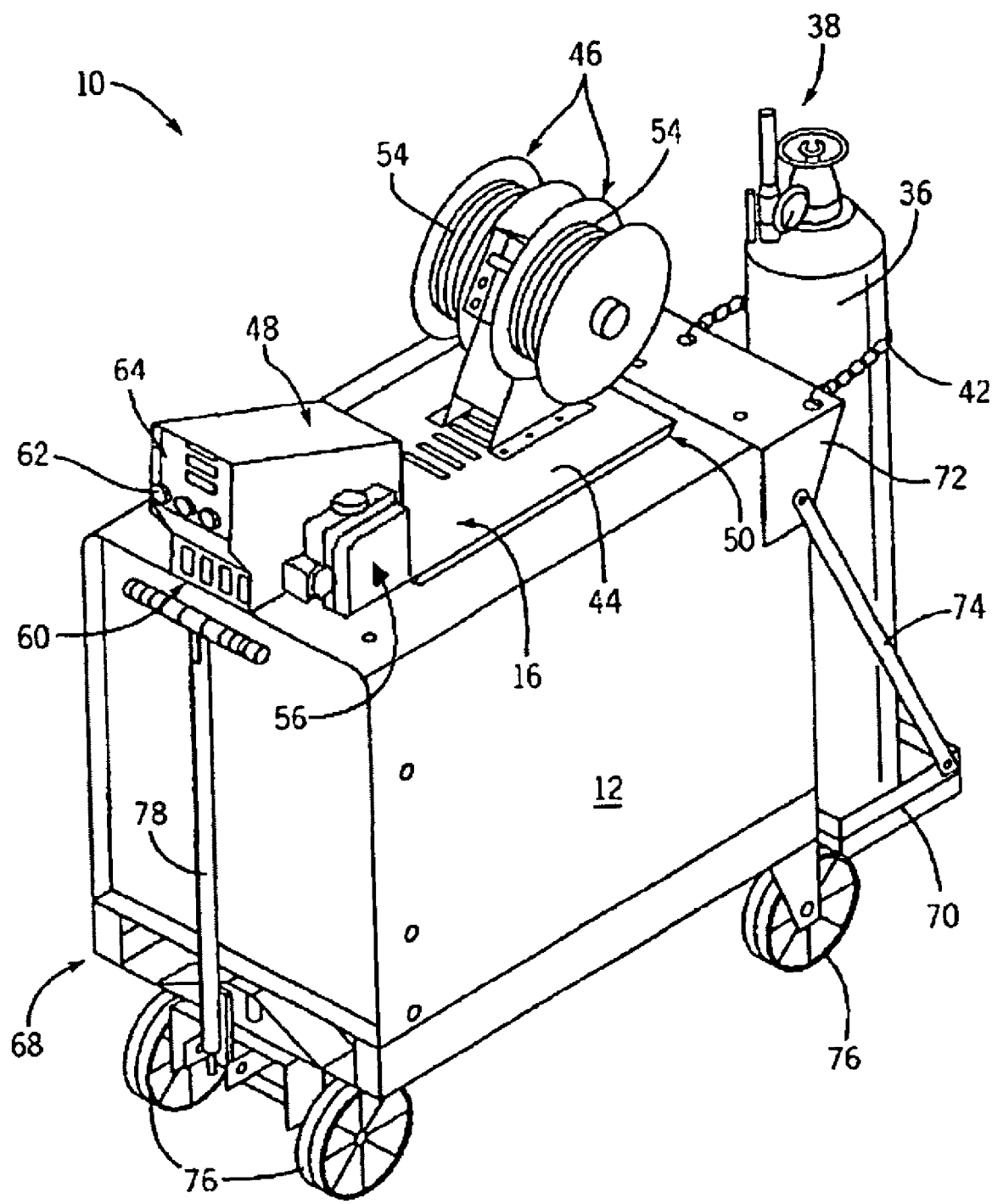
FIG. 2 shows a perspective view of a second embodiment of a welding system which includes a wire feeder assembly of the present invention.

Referring now to FIG. 2, the aforementioned welding system can also be embodied in a portable system. That is, the wire feeder assembly 16 can be positioned atop the power source 12 and jointly placed on a pull cart 68. The previously described rubber feet 50 limit sliding movement of the feeder when atop the power source 12. The pull cart can also include a cylinder support tray 70 configured to support gas cylinder 36. In this embodiment, chain 42 is secured to plate 72 which is connected to support tray 70 via cross-member 74. Plate 72 is also secured to a top rear portion of power source 12. Pull cart 68 includes wheels 76 and pulling arm 78 to assist with the transportability of the welding system.

Figure 3:
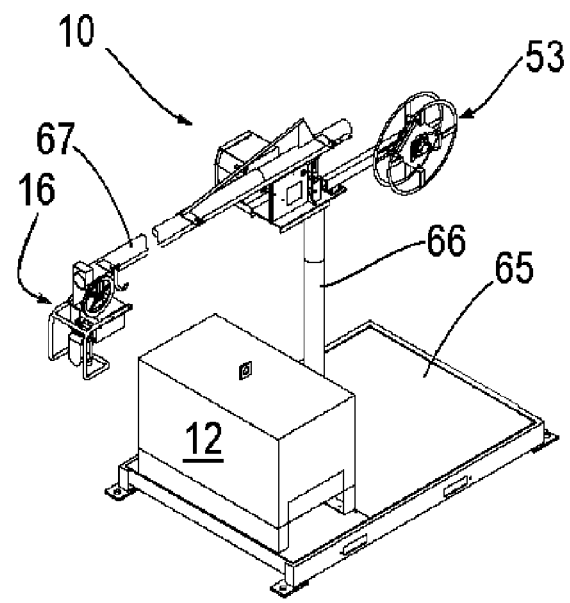
FIG. 3 shows a perspective view of a third embodiment of a welding system which includes a wire feeder assembly of the present invention.

Referring now to FIG. 3, in some embodiments welding system 10 comprises a relatively stationary power source 12, and a wire feeder assembly 16, optionally at least two wire feeder assemblies 16, adapted to be generally mobile relative to power source 12. Power source 12 can be positioned atop frame 65, and a post 66 can extend upwardly from frame 65. Beam 67 is pivotably attached to, and extends away in a first direction from, post 66. A support arm (not labeled) extends away from post 66, in a second opposite direction, and holds/supports reel 53. Reel 53 is adapted and configured to hold a spindle 46 (FIG. 2) of weld wire 54 (FIG. 2).

Preferably, beam 67 comprises a vertically oriented swivel assembly which enables the distal end of beam 67 to pivot about the swivel assembly, upwardly away from, and downwardly toward, frame 65 along an arcuate travel path. A first wire feeder assembly 16 can be mounted to the distal end of beam 67. In some embodiments, a second wire feeder assembly 16 is mounted near the point of attachment of beam 67 to post 66, and is aligned with the first wire feeder assembly 16, enabling a weld wire 54 (FIG. 2) to be fed through the first and second wire feeder assemblies 16, in series.

Figure 4:
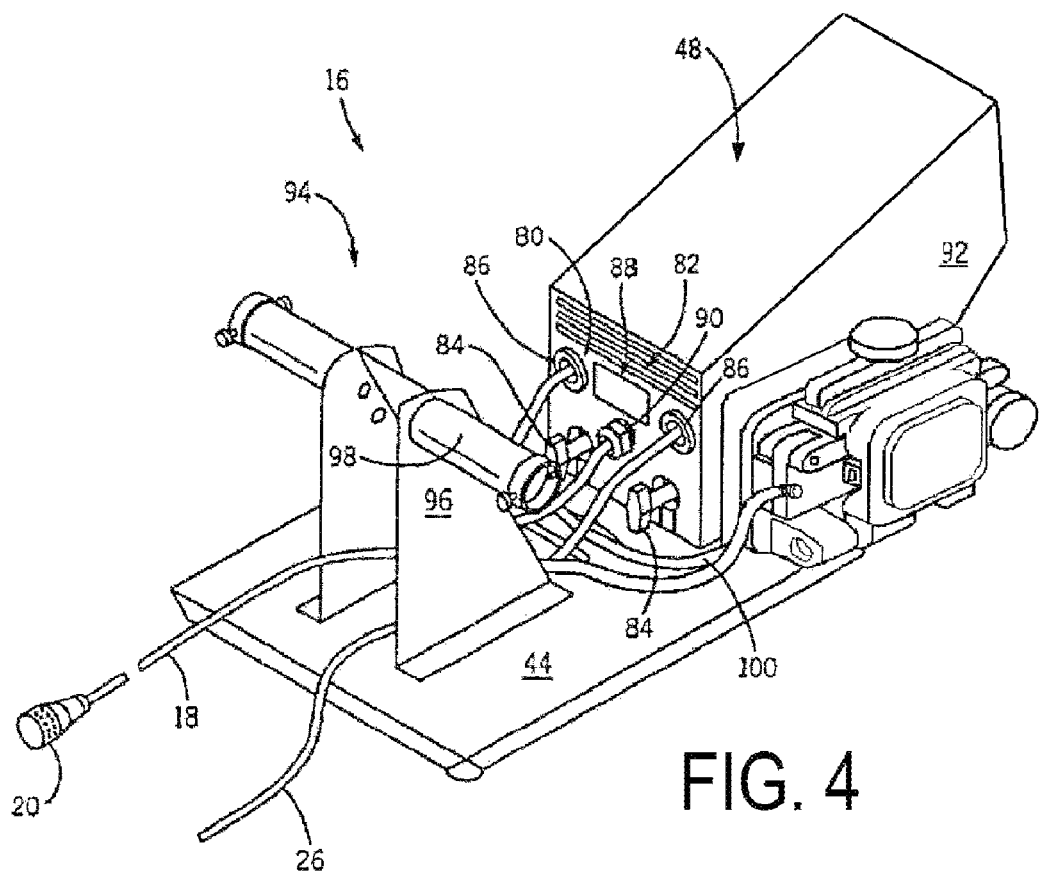
FIG. 4 shows a perspective view of a wire feeder assembly of the welding system illustrated in FIGS. 1-2.

Referring now to FIG. 4, the rear portion of wire feeder assembly 16 is shown. Control box 48 includes a back panel 80 which has a number of cooling vents 82 and a drive assembly rotation knob 84. Also secured to back panel 80 is a pair of shielding gas valve fittings 86, each of which receives a shielding gas hose. Preferably, positioned between the two shielding gas valve fittings 86, is a rating label 88. Control cable 18 is also connected to the back panel 80 via socket 90.

Mounted adjacent each side panel 92 of the control box, and supported by plate 44, is a pinch force mechanism "PEM" which includes drive assembly 56 (FIGS 4 and 5), cover assembly 160, and force converter "FC." Each drive assembly 56 includes a motor and other related components, which are described in greater detail below, which receive 24VAC control power from cable 18. Also supported by base plate 44 is a pair of structures 94, each consisting of a vertical plate 96 and rod 98 which supports a wire spool or reel 46 (FIG. 1). A jumper cable 100 extends between the drive assemblies, thereby providing power from the single weld cable 26 to both drive assemblies.

Figure 5:
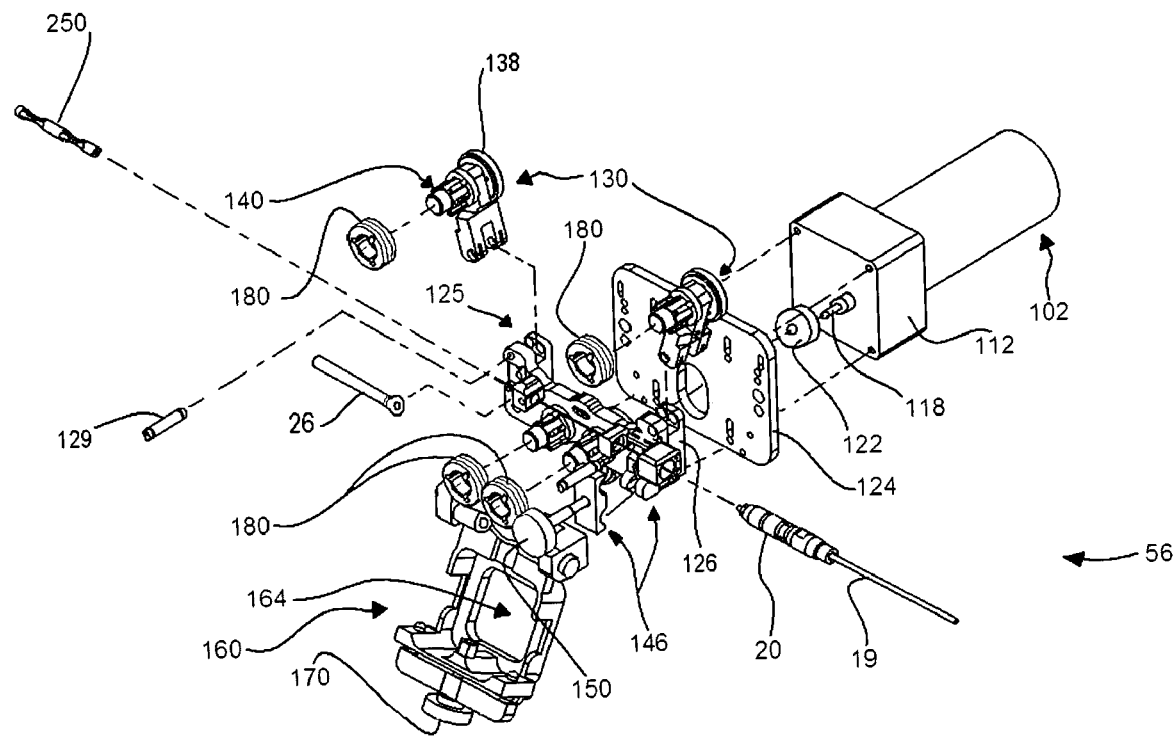
FIG. 5 shows an exploded view of a drive assembly of a wire feeder assembly of FIG. 4.

One embodiment of drive assemblies 56 of the present invention is shown in exploded detail in FIG. 5. The drive assembly includes motor 102 attached to a gearbox 112 which is in turn attached to isolation plate 124. Also attached to isolation plate 124 is carrier plate assembly 125 to which is attached swingarm assemblies 130, power block 146 (FIG. 6) and cover assembly 160.

Figure 6:
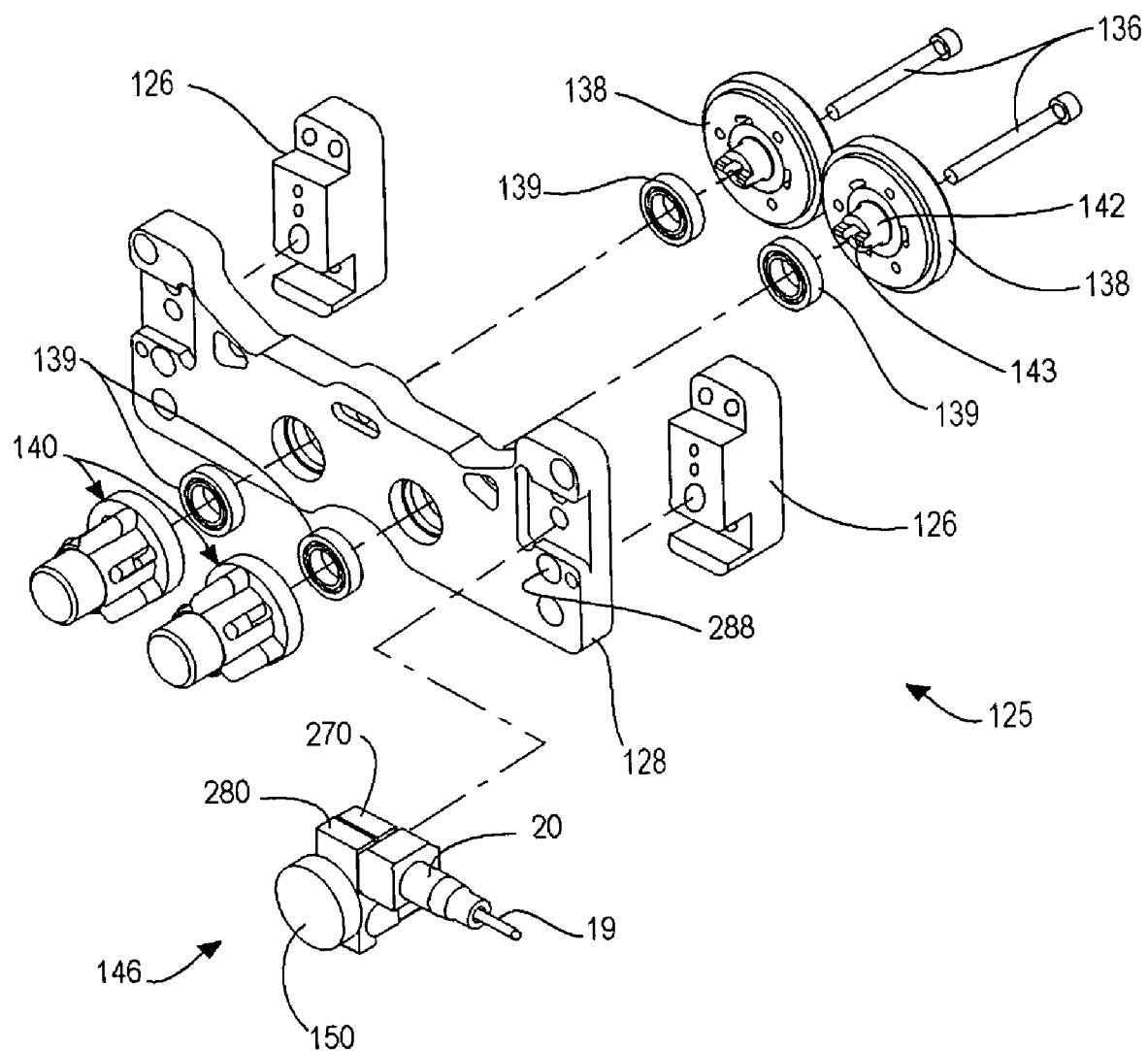
FIG. 6 shows an exploded view of the carrier plate assembly illustrated in FIG. 5.
Figure 16:
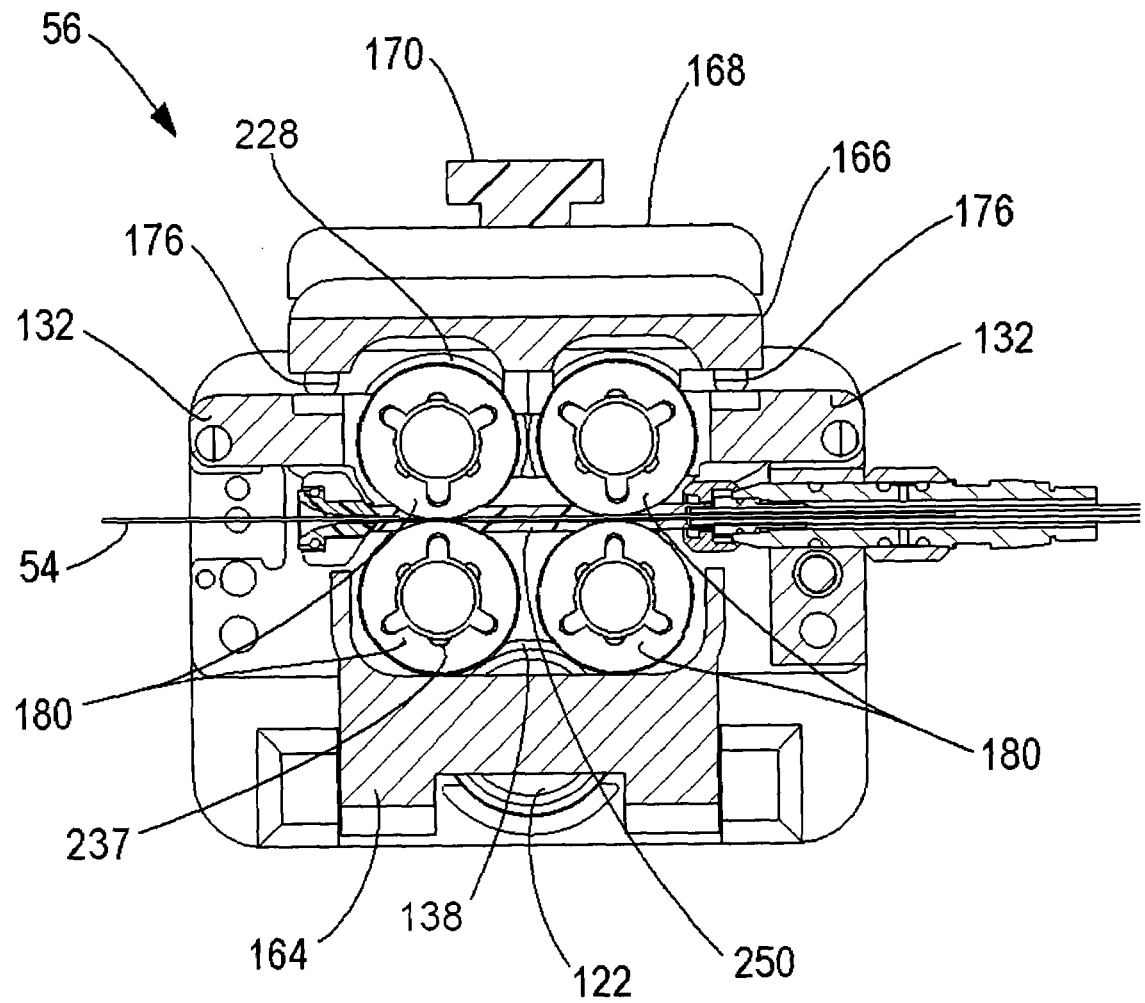
FIG. 16 shows a cross-sectional view of parts of an embodiment of a drive assembly of the present invention with the cover in the closed position.

In some embodiments, motor 102 is e.g. a one-eighth horsepower, 24 volt DC motor. One end of motor 102 is attached to a first side of gearbox 112, including a motor output shaft which is operably connected to the operating mechanism in gearbox 112. Extending outwardly from an aperture on a second opposite side of gear box 112 is a gearbox output shaft 118. Output shaft 118 is attached to, preferably removably attached to, drive pinion 122 by conventional means of attachment, including but not limited to, retaining rings, splined shafts and slots, keyway attachments, pins, and others. Drive pinion 122 has an outer circumferential surface which is adapted and configured to drivingly engage the outer circumferential surface of a second pinion such as carrier pinion 138 (FIGS. 6 and 16).

The side of gearbox 112, through which output shaft 118 extends, communicates with a first side of isolation plate 124 which is constructed of an electrically insulating, e.g. polymeric, material. A second, oppositely facing side of isolation plate 124 communicates with carrier plate assembly 125 which is attached to isolation plate 124. Gearbox 112, and thus electric motor 102, are mounted to isolation plate-124, separately from carrier plate assembly 125 whereby components of electric motor 102 and gearbox 112 are electrically isolated from components of carrier plate assembly 125. In addition, the drive train which connects shaft 118, drive pinion 122 and e.g. carrier pinions 138, includes one or more electrical isolation components which electrically isolate the motor end of the drive train from the driven end of the drive train. For example, drive pinion 122 can have a non-conducting e.g. nylon core which drives a conducting, e.g. metal toothed outer ring, or for example a metal core which drives a non-conducting toothed outer ring. Or shaft 118 can be non-conducting, or driven pinion 138 can be non-conducting. In light of disclosure herein, other non-conducting structures will be known or obvious to those skilled in the art.

Power block 146 (FIG. 6) is mounted to carrier plate 128 and is thus also electrically isolated from components of electric motor 102 and gearbox 112. Referring again to FIG. 5, hinge pin 129 extends through at least one aperture which extends through an upper portion of carrier plate assembly 125 and at least one aperture which extends through swingarm assembly 130, thereby pivotably attaching swingarm assembly 130 to carrier plate assembly 125.

Weld cable 26, which typically carries the welding power from power source 12 to the drive assembly, attaches to carrier plate 128 at the end of plate 128 which is opposite power block 146, as illustrated in FIG. 5, so as to electrically energize the drive assembly and pass the welding power to weld wire 54.

Attached to isolation plate 124, below the point of attachment of carrier plate assembly 125, is cover assembly 160. Cover 164 pivots about pins 163 (FIG. 15A), relative to isolation plate 124, between first and second positions. In the first position, cover 164 generally covers carrier plate assembly 125. In the second position, cover 164 generally exposes carrier plate assembly 125. When cover 164 is in the position generally covering carrier plate assembly 125, upper components of cover assembly 160 communicate with cooperating elements of swingarm assemblies 130 and apply downward forces onto the swingarm assemblies 130.

Power block 146 is attached to carrier plate assembly 125. Knob 150 enables a user to removably secure power pin 20 (FIG. 6) and thus gun 52 (FIG. 1) to power block 146. As is described in greater detail below, knob 170 has an elongate projection which is threadedly received in an aperture which extends through a top portion of cover 164, enabling knob 170 to be manipulated by a user to adjust the amount of force which is applied to swingarm assemblies 130.

Wire guide 250 (FIG. 5) extends generally parallel to, and along a portion of, carrier plate assembly 125. Wire guide 250 is adapted and configured to be received between at least two of drive rolls 180 and has first and second opposing ends. The first end of wire guide 250 is generally oriented toward spindles 46 (FIG. 1). The second end of wire guide 250 is generally oriented toward power pin 20.

Carrier plate assembly 125 as shown in detail in FIG. 6 includes spacer blocks 126 which communicate with isolation plate 124 (FIG. 5) and carrier plate 128.

Assembly 125 further includes carrier pinions 138 which are mounted to plate 128 by bearings 139. Carrier pinions 138 are also drivingly mounted to carriers 140 by bolt 136, which extends axially through the respective apertures in carrier plate 128, as well as axially into both pinions 138 and carriers 140 such that carriers 140 turn in common with pinions 138 on bearings 139.

Carrier plate assembly 125 further includes power block 146, which is mounted to carrier plate 128, as illustrated in FIG. 6.

Spacer blocks 126 each have a first generally planar surface facing a first direction, which communicates with isolation plate 124 (FIG. 6), and a second generally planar surface facing a second opposite direction, and communicating with carrier plate 128. The distance between the first and second generally planar surfaces of spacer blocks 126 defines a thickness dimension which is at least as great as the thickness dimension of carrier pinions 138, thus to enable carrier pinions 138 to be positioned between isolation plate 124 and carrier plate 128.

Carrier plate 128 has a plurality of apertures formed therethrough, which enable removable attachment of various components of the carrier assembly to the plate, using conventional hardware, such components including, but not being limited to, spacer blocks 126 and power block 146.

Plate 128 has a thickness dimension corresponding in general to not less than, typically more than, the collective thickness dimension of bearings 139. Where, as illustrated in FIG. 6, multiple bearings are used in side by side relationship, the thickness of plate 128 at the bearing apertures is preferably at least as great as the combined thicknesses of all the bearings which are used in the respective bearing apertures.

The bearing apertures are sized and configured to receive the outer races of bearings 139 to be inserted thereinto, enabling bearings 139 to be accepted into plate 128 by e.g. a press fit. In preferred embodiments, the bearing apertures include a lip or shoulder to provide a mechanical stop, and thus separation, between respective bearings 139. Accordingly, the bearings 139 are separated from each other by a distance corresponding to a thickness dimension defined by the lip or shoulder of the bearing apertures.

The thickness dimensions of spacer blocks 126 provide adequate distance between isolation plate 124 and plate 128 so that carrier pinions 138 can generally freely rotate therebetween via bearings 139 without touching isolation plate 124.

A carrier pinion 138 has a generally cylindrical projection 142 which is adapted and configured to extend at least partially through, and to interface with, an inner race of a bearing 139. The terminal end of the cylindrical projection has at least one protuberance 143 which is adapted and configured to interface with carrier 140.

A bore extends through carrier pinion 138 and its cylindrical projection, enabling bolt 136 to extend through such bore and to threadedly attach carrier pinion 138 and carrier 140 to each other. Body 220 (FIG. 9B) of carrier 140 includes a base plate 221, which has opposing surfaces 223A, 223B. Surface 223B has one or more receptacles or recesses, which cooperate with and receive, protuberances 143 on the cylindrical projection of carrier pinion 138, such that the cooperation of the protuberances, and receptacles or recesses, causes carrier pinion 138 to drivingly engage carrier 140, e.g. rotation of carrier pinion 138 correspondingly drivingly rotates carrier 140. Carrier pinion 138 is mounted to carrier 140 by threads on bolt 136 being engaged with a threaded bore which extends through base plate 221 of carrier 140.

In some embodiments, the main power for establishing and maintaining the welding arc is transferred from power source 12 (FIGS. 1-3) through cable 26 (FIGS. 1 and 3) which is attached to one of the apertures extending through plate 128. The main power for the welding arc is then transferred through plate 128, which is made of a conductive material, through power block 146, power pin 20, gun 52, and up to the weld/workpiece. In some embodiments, power from cable 26 is manipulated, by conventional means, to appropriate levels and thereupon is also used to energize motor 102 as desired, whereupon cable 18 is not needed.

Figure 7:
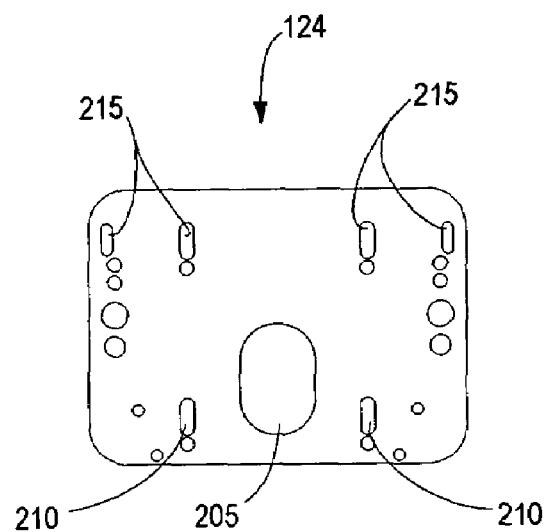
FIG. 7 shows an enlarged front elevation view of the isolation plate illustrated in FIG. 5.

Isolation plate 124, as shown in detail in FIG. 7, has a first surface which faces and communicates with gearbox 112 (FIG. 5) and a second surface which faces the opposite direction, e.g. faces and communicates with carrier plate assembly 125. As shown in FIG. 7, isolation plate 124 has a plurality of generally annular apertures and a plurality of generally elongate apertures e.g. slot-shaped openings 205, 210, 215 which enable a user to adjust the mounting positions of respective components which are mounted to isolation plate 124.

Output shaft 118 and drive pinion 122 extend through opening 205, sufficiently far to enable drive pinion 122 to interface with ones of carrier pinions 138 (FIGS. 5 and 16). In some embodiments, gearbox 112 has a generally rectangular face which communicates with isolation plate 124 and the mounting structure e.g. a threaded post or bolt proximate each corner.

Each of the mounting structures extends through respective ones of e.g. slots 210, 215, thus enabling gearbox 112 to be attached to isolation plate 124 with convention hardware. Slots 205, 210, 215 are adapted and configured to enable a user to mount gearbox 112 relatively higher or relatively lower on isolation plate 124 corresponding to e.g. the diameter of a desirable drive pinion 122. Gearbox 112 is mounted relatively lower in slots 205, 210, 215 to accommodate a relatively taller (greater diameter) drive pinion 122 and is mounted relatively higher in slots 205, 210, 215 to accommodate a relatively shorter (lesser diameter) drive pinion 122.

In preferred embodiments, isolation plate 124 is made of a poorly electrically conducting material, e.g. electrically insulating material, so as to electrically isolate the high voltage commonly employed on carrier plate assembly 125 and components mounted thereto, from gearbox 112 and components mounted thereto. Suitable materials for making isolation plate 124 include, but are not limited to, various polymeric compounds such as various of the polyolefins, and a variety of the polyethylenes, e.g. high density polyethylene, or polypropylenes. There can also be mentioned such commodity polymers as polyvinyl chloride and chlorinated polyvinyl chloride copolymers as well as a wide variety of the copolymers which embody the above-recited materials, as well as others.

Referring now to FIGS. 6, 8A, 8B, and 8C, power block 146 is mounted to plate 128 at a recess in plate 128. Power block 146 includes knob 150, power block base 270, and pin holder 280. Power block base 270 has, on one side, a relief, e.g. receiving structure 272, formed therein, and on another side a convex projection, e.g. knuckle 274 extending upwardly therefrom. Bore 276 extends through a medial portion of power block base 270, generally between receiving structure 272 and knuckle 274.

Figure 8A:
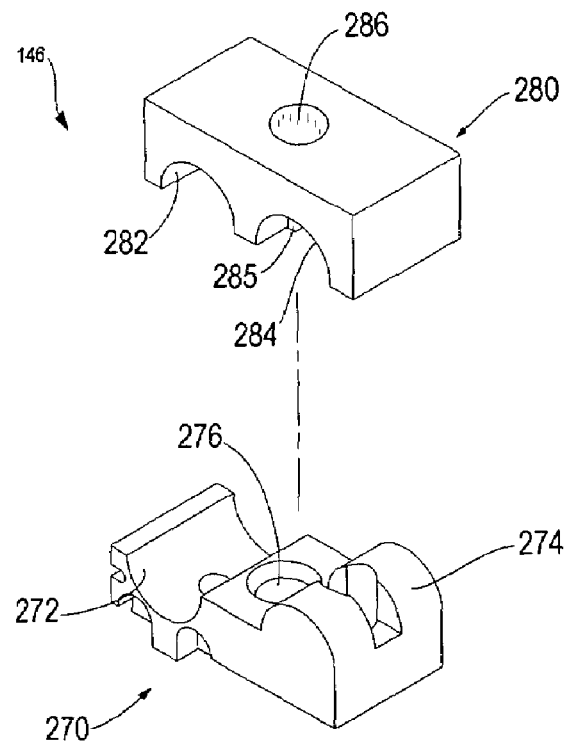
FIGS. 8A, 8B, and 8C show enlarged perspective views of the power block illustrated in FIG. 5.
Figure 8B:
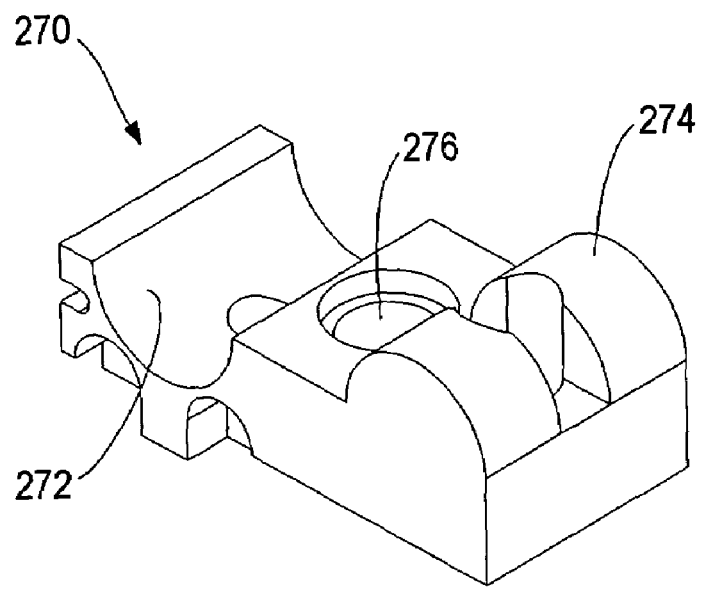
Figure 8C:
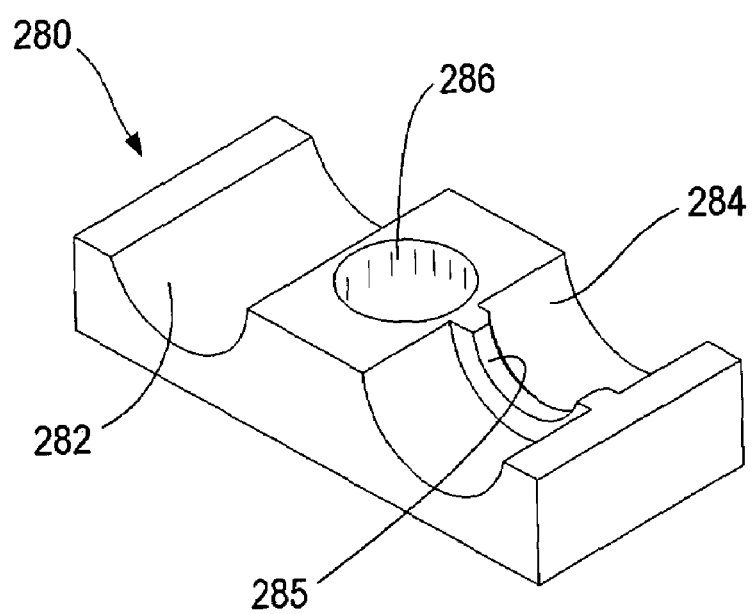

Pin holder 280 has, on one side, a generally continuous first relief formed therein, e.g. receiving structure 282, and on another side a second relief, e.g. receiving structure 284, which is generally discontinuous as separated by projection 285 (FIG. 8C). Bore 286 extends through a medial portion of pin holder 280 generally between receiving structures 282 and 284.

Knob 150 has an elongate threaded stem which extends freely through bores 276 and 286, and which threadedly engages aperture 288 (FIG. 6) in plate 128, thus mounting base 270 and pin holder 280, and correspondingly power block 146, to plate 128 while enabling pin holder 280 to be rotated about the stem, as well as about base 270. Accordingly, pin holder 280 can be rotated and/or reversed between a first and second position. The first position is defined by the receiving structures 272 and 282 being generally aligned, whereas the second position is defined by the receiving structures 272 and 284 being generally aligned.

Knob 150 can also be used, by way of the threaded stem, to tighten pin holder 280 against power block base 270. Tightening knob 150, and thus pin holder 280 against power block base 270, enables power block 146 to securely capture the power pin 20. Pin 20 can be captured/held between receiving structures 272 and 282, alternatively between receiving structures 272 and 284, depending on the configuration of the respective power pin. In some embodiments, pin 20 has a power block interface, such as a groove or channel, which is adapted and configured to receive projection 285 of receiving structure 284 enabling projection 285 to provide a mechanical interference between pin 20 and power block 146, in addition to the clamping force provided by respective components of power block 146.

The power block interface of pin 20 and projection 285 cooperate to relatively increase the resistance to e.g. non-desired power pin removal, such as for example when a user/operator does not desire pin 20 to be removed from power block 146, and a force is applied generally coaxially with pin 20 in a direction outwardly from power block 146 which would correspondingly tend to urge pin 20 outwardly from power block 146.

Figure 9A:
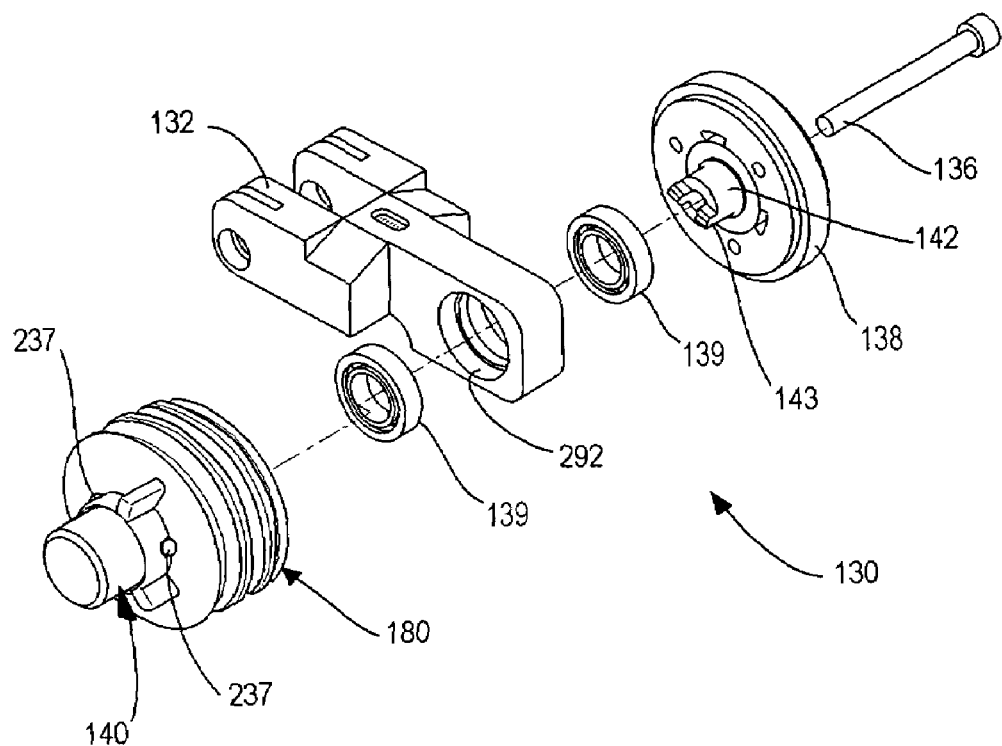
FIGS. 9A and 9B show perspective exploded views of components of the swingarm assembly illustrated in FIG. 5.

Referring now to FIG. 9A, each swingarm assembly 130 includes a swingarm 132, one of the carrier pinions 138, first and second bearings 139, and a carrier 140. A bore 292 extends through swingarm 132, the bore being sized and configured to receive the outer races of bearings 139, thus enabling the bearings 139 to be accepted into swingarm 132 by a press fit. In preferred embodiments, bore 292 includes a lip or shoulder to provide a mechanical stop, and thus separation, between respective bearings 139. Accordingly, the bearings 139 are separated from each other by a distance corresponding to a thickness dimension defined by the lip or shoulder of the bore 292.

Bolt 136 extends through the bore of carrier pinion 138 and terminates in carrier 140, generally attaching the two. As described above, carrier pinion 138 has one or more protuberances 143, and carrier 140 has corresponding interfacing receptacle structure which enables the carrier pinion 138 to be drivingly coupled to carrier 140, thus to drivingly engage carrier 140.

Swingarm assembly 130 is pivotably attached to carrier plate assembly 125 by hinge pin 129 (FIG. 5), thus enabling swingarm assembly 130 to pivot between a first generally open position, as suggested by FIG. 5 and a second generally closed position (FIG. 16). Accordingly, swingarm assembly 130 and swingarm 132 are adapted and configured to pivotably travel along a generally arcuate pivot path direction. The arcuate pivot path generally defines a plane which is e.g. generally perpendicular to the axis of rotation of ones of drive rolls 180.

In the generally closed position, the upper carrier pinion 138, which is mounted to swingarm 132, is engaged by the corresponding lower carrier pinion 138, which is mounted to carrier plate 128 and which is driven by drive pinion 122. Thus, with the swingarm assembly positioned in the closed position, rotation of drive pinion 122 causes corresponding driving and rotation, in cooperative unison, of the upper and lower carrier pinions, and corresponding rotation of the respective drive rolls 180, which are mounted to the carriers 140, which are mounted to the respective carrier pinions 138.

Thus, the outer circumferential surface of an upper carrier pinion 138, which is mounted to swingarm 132, is adapted and configured to interface with a respective outer circumferential surface of a corresponding lower carrier pinion 138, such as by corresponding meshing teeth on respective ones of upper and lower carrier pinions 138, enabling drive pinion 122 (FIG. 5) to drive a lower carrier pinion 138 on plate 128 (FIG. 6) which, in turn, drives the respective upper carrier pinion 138 on a respective swingarm 132.

Figure 9B:
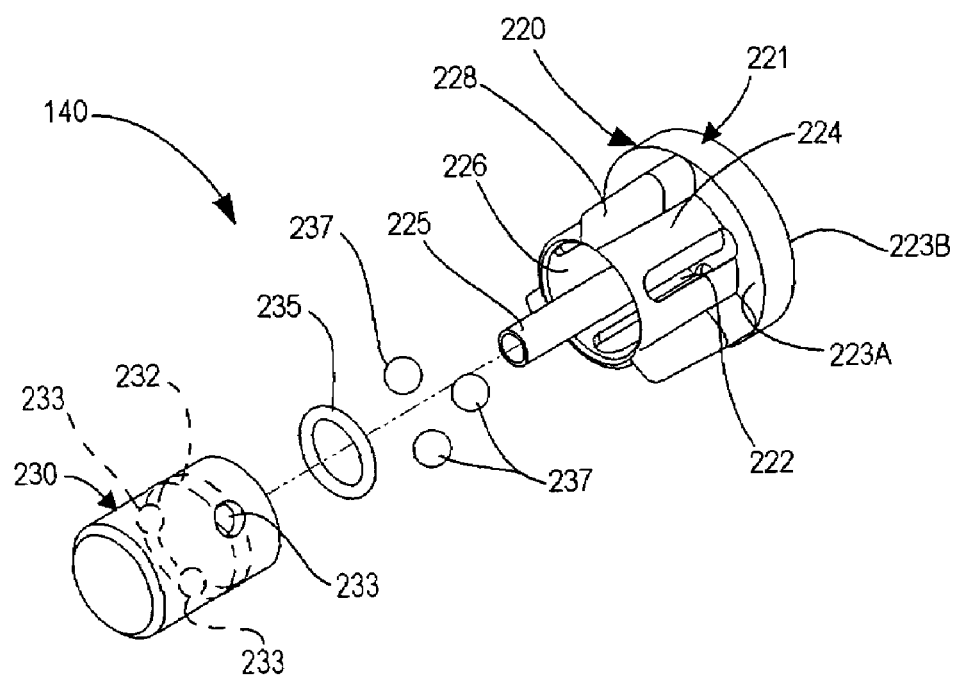

Carrier 140 as shown in detail in FIG. 9B includes, in general, body 220 and button 230. Body 220 includes base plate 221, and open-faced receptacle 224 extending away from surface 223A of the base plate. Slots 222 extend through the side wall of receptacle 224. Receptacle 224 and base plate 221 collectively define an inner cavity 226. Interface lugs 228 extend outwardly of the outer surface of the side wall of receptacle 224, and the open end of receptacle 224 is sized and configured to receive button 230 into inner cavity 226.

Compression spring 225 is received into cavity 226, and extends between base plate 221 and button 230, and biases button 230 away from base plate 221. Groove 232 is an annular depression formed in the inner circumferential surface of the side wall of button 230. Apertures 233 extend through the side wall of button 230 at groove 232, and are sized and configured to confiningly pass ball bearings 237 therethrough.

Compression ring 235 is adapted and configured to be biasingly held in groove 232 and to apply a biasing, outwardly-directed force against ball bearings 237.

Each of slots 222 in the sidewall of receptacle 224 defines an opening width dimension between the elongate side walls of each respective slot. Each ball bearing 237 has a diameter of greater magnitude than the magnitude of the width of the respective slot 222 into which the ball bearing is mounted, which prevents the respective ball bearing 237 from passing through the corresponding slot 222. Accordingly, the ball bearing 237 extends freely through the respective apertures 233, as biased by compression ring 235, and partially through the respective slot 222 but is prevented, by the limited width of slot 222, from passing entirely through the respective slot 222, thereby to hold a respective drive roll 180 onto carrier 140, as explained in more detail following.

Figure 12A:
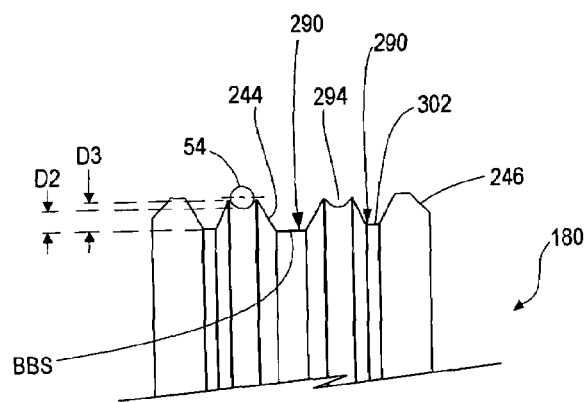
FIGS. 12A and 12B show front elevation views of portions of first and second embodiments of drive rolls of the present invention.

Referring now to FIGS. 10, 11A, 11B, 12A, 12B, and 12C, a drive roll 180 has a circular outer periphery 182 and a concentric bore 240, a first side 238, and a second side 239. Drive roll 180 has a generally circumferential outer body surface 290 wherein the magnitude of the circumference of the outer diameter varies on a traverse between the first and second sides of the drive roll. First and second elevated wire interfaces 244 extend annularly outwardly from lesser diameter base body surface portions of outer body surface 290. In some embodiments, groove 294 of the elevated wire interface 244 expresses an arcuate, e.g. semi-circular, cross-section (FIG. 12A). Such arcuate shape enables groove 294 to generally interface with the entirety of the lower portion of the surface of weld wire 54.

In other embodiments, the groove expresses an angular cross-section, optionally a V-shaped cross-section (FIG. 12B), whereby groove 294 generally supports/drives at two opposing contact points on the surface of weld wire 54, the opposing contact points being below the center-line of, and above the bottom-most surface of, weld wire 54. Typical opening cross-sections for both semi-circular and angular shaped grooves 294 include, but are not limited to, cross-sections which receive weld wire 54 having diameter of 0.03 inch, 0.035 inch, and 0.045 inch.

Preferably, each of two grooves 294 is located at a common distance D (FIG. 11A) from sides 238 and 239, respectively.

Figure 10:
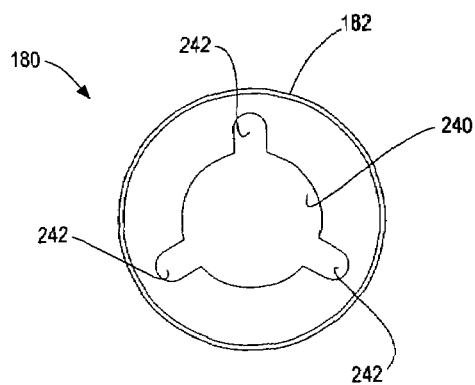
FIG. 10 shows a side elevation view of a drive roll of the present invention.
Figure 11A:
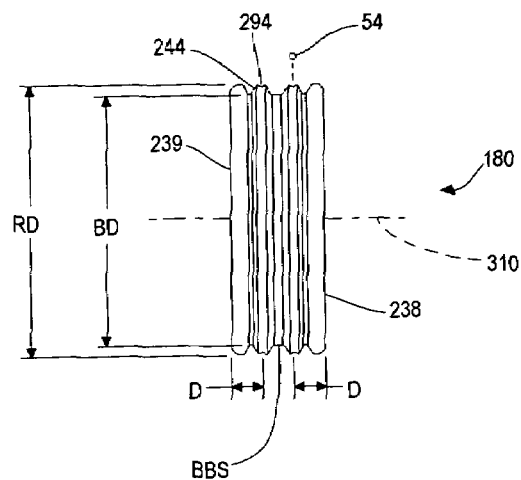
FIGS. 11A and 11B show front elevation views of first and second embodiments of drive rolls of the present invention.
Figure 11B:
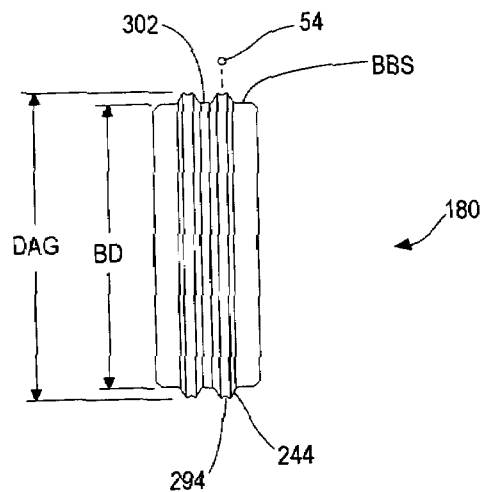

Referring to FIG. 10, three circumferentially spaced through-slots 242 extend between the first and second sides 238 and 239 of the drive roll. Each through slot 242 opens into concentric bore 240 and is sized and configured to receive a lug 228 of carrier body 220, whereby drive roll 180 is slidingly received onto carrier 140 (FIG. 9).

Circumferential outer body surface 290 of a drive roll 180 defines a base body surface BBS at dimension BD (FIGS. 11A and 11B), which base body surface supports the wire interface structure. The base body surface BBS need not be circular, and can have any of a wide range of surface configurations about the periphery of the drive roll.

Elevated wire interface 244 defines an interface diameter DAG at the circumferential tops, peaks, of grooves 294. In the illustrated embodiments, each wire interface structure 244 has first and second peaks, spaced laterally from each other, and a groove 294 therebetween; and the cross-section of the groove corresponds in general, including in magnitude, to the outer surface of the weld wire. In the arcuate embodiments of the grooves, the arc of the groove follows the arc of the wire quite closely. In the more angular, e.g. V-shaped grooves, the groove corresponds with the wire size, but deviates from the outline defined by the outer surface of the wire. Rim 246 defines a rim diameter RD at the top of rim 246.

Figure 12B:
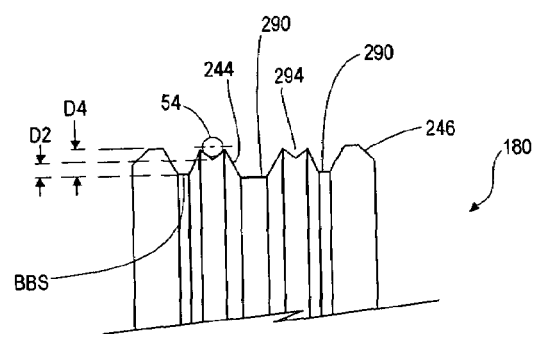

Referring to FIG. 12A, the lowest point of groove 294 is displaced outwardly from base body surface BBS by a distance D2. The outer-most portion of elevated wire interface 244, namely the top of groove 294, is displaced outwardly from base body surface BBS by a distance D3. The outer-most portion of rim 246, namely the top of rim 246, is displaced outwardly from base body surface BBS by a distance D4 (FIG. 12B). In some embodiments, the magnitude of distance D4 is greater than the magnitude of distance D3 whereby external forces directed generally at the outer body surface of the drive roll tend to impact at rims 246 in preference to grooves 294. Thus, the even slight elevation of rim 246 above the height of the tops of grooves 294 (greater diameter) operates such that rims 246 serve in a protective role with respect to grooves 294. For instance, if the drive roll is dropped onto a flat surface such as a floor, the impact is typically received at one of rims 246, whereby the grooves 294 are unaffected by such minor accidents.

Referring now to FIGS. 13A, 13B, 13C, 13D, and 13E, wire guide 250 has an elongate body which extends between first and second ends 296A, 296B respectively. A cylindrical end counter bore 257 extends from the first end axially and longitudinally into the elongate body of guide 250. Conical end counter bore 259 extends from the second, opposite end axially and longitudinally into the elongate body. Main bore 255 has a diameter which corresponds closely to the diameter of a weld wire 54 to be fed through bore 255, and extends generally the full length of guide 250 between cylindrical end bore 257 and conical end bore 259, generally centrally through the elongate body of guide 250 so as to provide lateral support to the weld wire for substantially the full length of the path of travel of the weld wire through drive assembly 56. As illustrated in FIG. 16, where bore 265 does not provide lateral support for the full circumference of the wire, namely the bore provides support only on the sides of the wire, the wire is otherwise supported on the top and bottom by the upper and lower drive rolls 180.

Cylindrical end bore 257 is adapted and configured to accept liner 19 of a welding gun 52. Conical bore 259 is adapted and configured to accept inlet guide 17 where the welding wire feeds into the drive assembly. Inlet guide 17 and liner 19 each have through bores sized to correspond to the weld wire 54 of the size for which the wire guide is designed and configured, whereby inlet guide 17, liner 19, and wire guide 250 all have generally common-size through bores which are adapted and configured to collectively provide for columnar support of the weld wire as the weld wire traverses the drive assembly.

The interfacing of liner 19 and counter bore 257 provides positional alignment and support and stabilization to guide 250 at first end 296A. Guide 250 is additionally aligned and/or supported and stabilized by inlet guide 17 at second end 296B.

Figure 17:
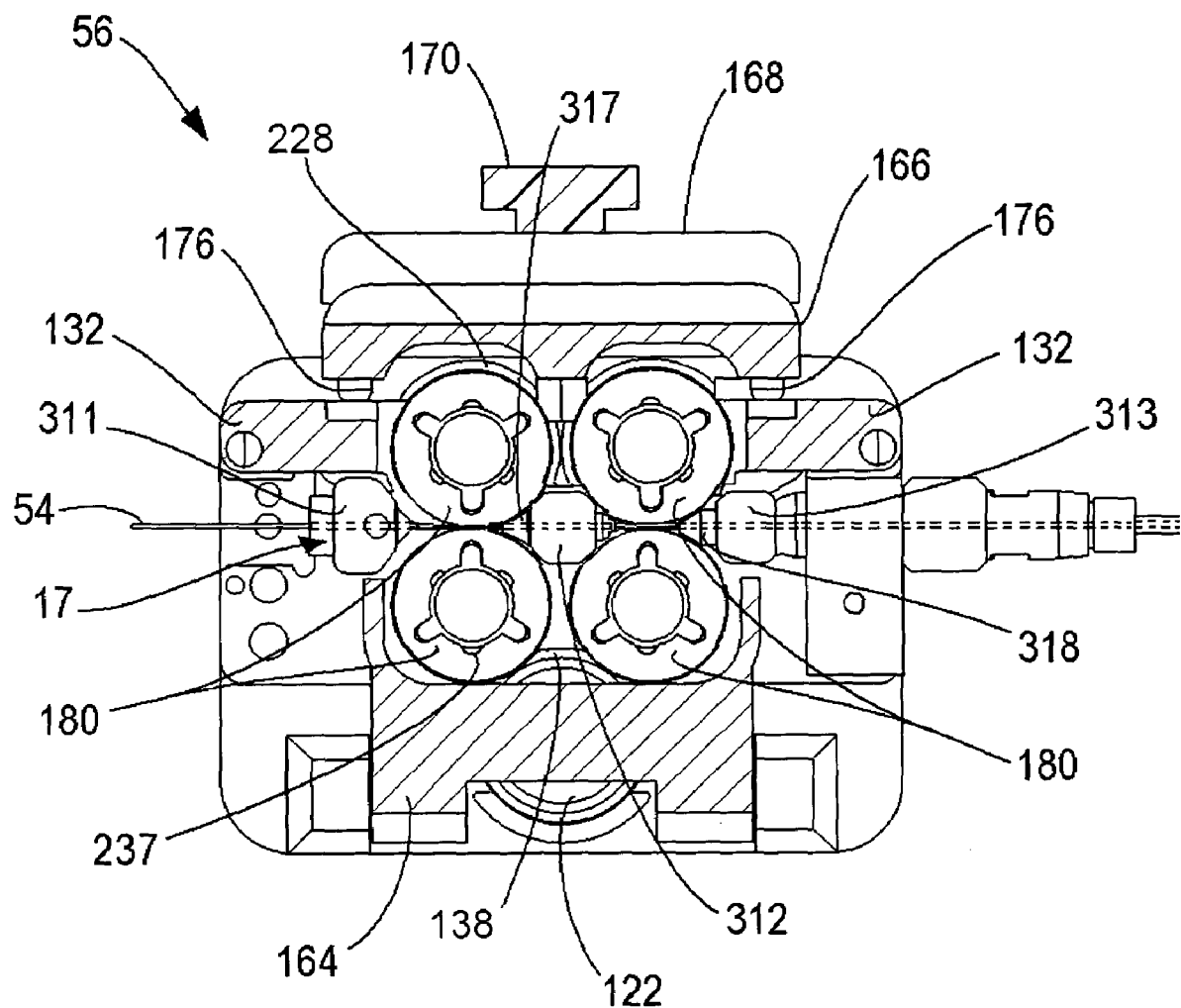
FIG. 17 shows a cross-sectional view of parts of another embodiment of a drive assembly of the present invention with the cover in the closed position.

Guide 17 is held in a relatively fixed position by the interface of o-ring 21 and a support structure, e.g. inlet guide block 311 (FIG. 17), which has an annular cavity which extends generally parallel to carrier plate assembly 125 and in line with the desired path of advance of wire 54 (FIG. 5). The annular cavity extending into inlet guide block 311 includes a lip or shoulder to provide a mechanical stop, which longitudinally holds guide 17. In alternative embodiments, wire guide 250 is generally held and positioned, in the drive assembly, only by corresponding ones of drive rolls 180 above and below wire guide 250.

Inlet guide 17 can be a separate element, an end of which is mounted into wire guide 250. In the alternative, inlet guide 17 can be an integral part of the wire guide, e.g. integrally molded as part of, or otherwise attached to, wire guide 250 whereupon O-ring 21 can communicate directly with the outer surface of the elongate body of wire guide 250, via a channel in the elongate body. Where the collar is a separate element, such O-ring channel is part of the separate collar element. In any event, inlet guide 17 includes a collar 295 which extends outwardly of the outer surface of the elongate body of wire guide 250, away from the longitudinal axis of the wire guide, at or adjacent the inlet end of the elongate body. O-ring 21 is received into a circumferentially-extending recess configured in the outer surface of inlet guide 17, e.g. a recess in the collar.

In the process of assembling the wire guide 250 to the drive assembly, the user inserts a portion of liner 19, extending from power pin 20, into cylindrical end counter bore 257 and inserts a conically tapered end of inlet guide 17 into conical end counter bore 259 which generally coaxially aligns (i) bore 255, (ii) a bore extending through liner 19, and (iii) a bore extending through inlet guide 17, with each other; thereby enabling weld wire 54 to pass through inlet guide 17, wire guide 250, and liner 19, in succession toward the welding arc, without passing though any substantial distance wherein the welding wire is unsupported along its sides. Namely, at virtually all locations between inlet guide 17 and liner 19, the wire columnar strength is supported by either bore 255, or guide 17, or liner 19, or grooves 294 of the drive rolls.

Figure 13A:
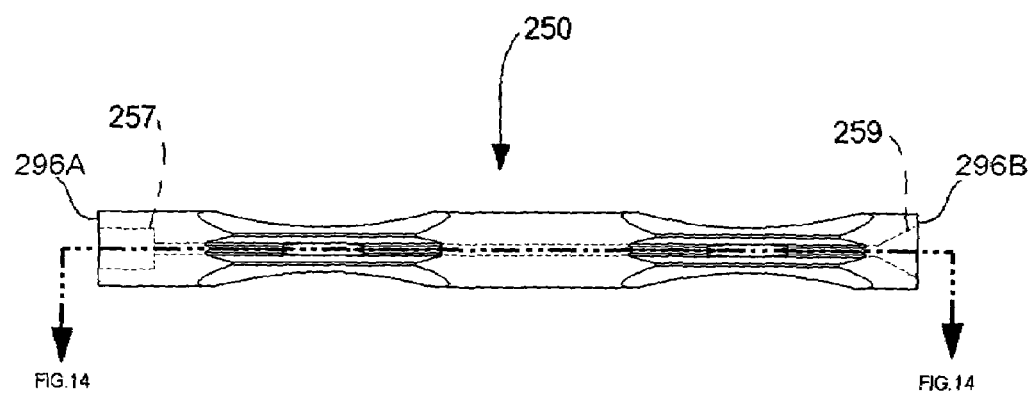
FIGS. 13A, 13B, 13C, and 13D show top and side elevation views of respective embodiments of wire guides of the present invention.
Figure 13B:
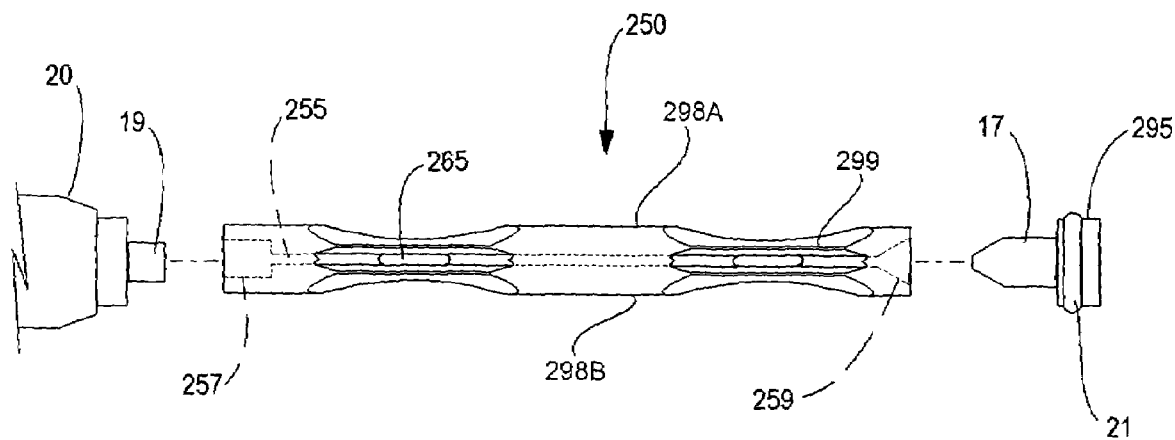
Figure 13C:
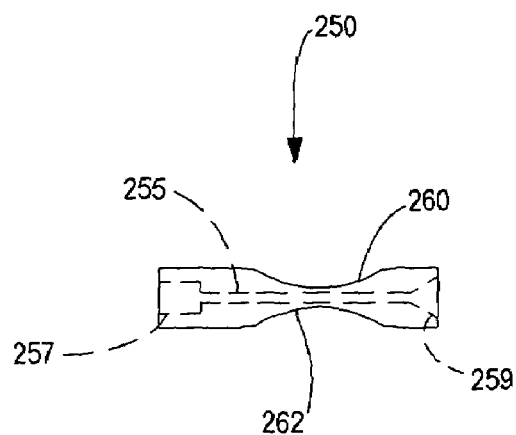
Figure 13D:
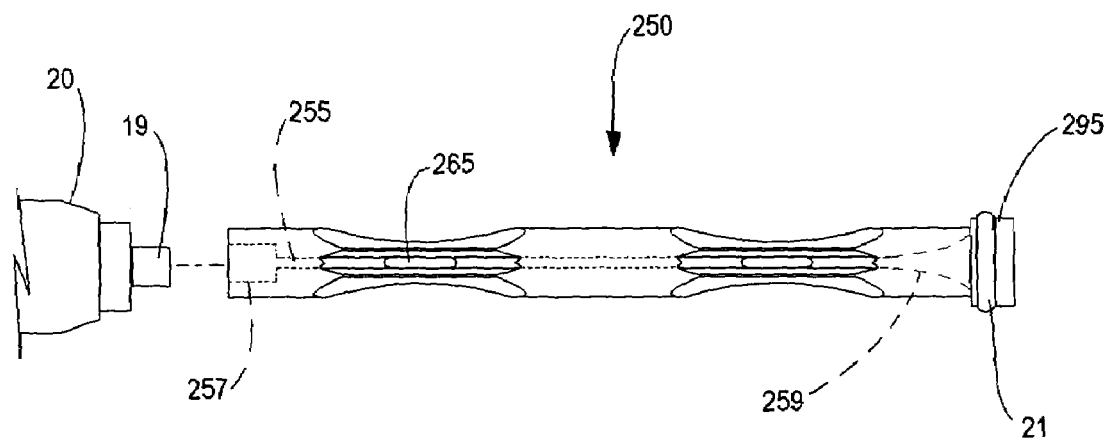
Figure 13E:
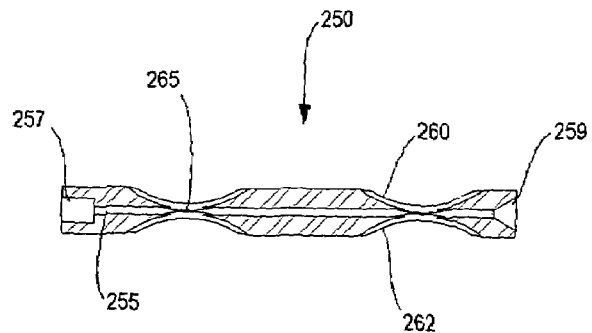
FIG. 13E shows a longitudinal cross-sectional side view of the wire guide illustrated in FIG. 13A.

Referring to FIGS. 13C and 13E, first and second diametrically opposed depressions, e.g. upper depression 260 and lower depression 262, extend inwardly from relatively top and bottom surfaces of the wire guide toward bore 255, and open into opposing sides of bore 255. The intersection of upper depression 260, lower depression 262, and bore 255 defines aperture 265 (FIGS. 13B, 13D) which extends through guide 250 from top to bottom. Typically, the width of aperture 265, across the width of the guide, is no more than three times, preferably no more than two times, the diameter of bore 255, and may be as small as substantially equal to the diameter of the bore, or any size between the diameter of the bore and three times the diameter of the bore. In some embodiments, wire guide 250 has a single pair of diametrically opposed depressions (FIG. 13C). In other embodiments, wire guide 250 has multiple pairs of diametrically opposed depressions (FIG. 13E).

Figure 12C:
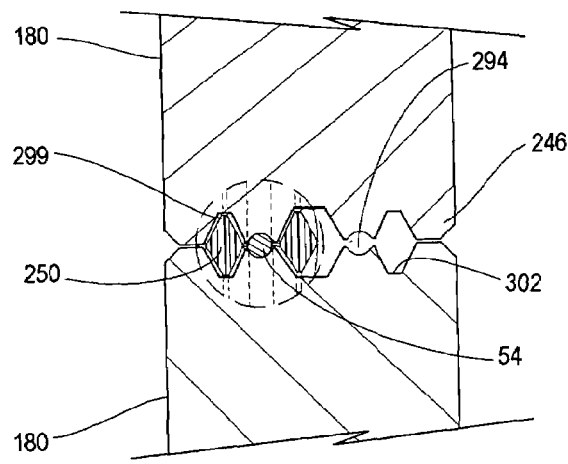
FIG. 12C shows a cross-sectional view of portions of drive rolls and a wire guide of the present invention driving a weld wire.

As illustrated in e.g. FIG. 12C, the contours and radii of upper depression 260 and lower depression 262 correspond generally to outer circumferential surface characteristics, namely outer body surface 290, of corresponding drive rolls 180 which interface with the respective depressions. In some embodiments, the thickness dimension of drive roll 180, defined by the distance between drive roll sides 238 and 239, is greater than the maximum thickness dimension of wire guide 250 between sides 298A and 298B (FIG. 13B).

Upper depression 260 and lower depression 262 can have differing contours and radii, such as when the drive roll 180 communicating with upper depression 260 and the drive roll 180 communicating with lower depression 262 have differing e.g. surface characteristics. Accordingly, wire guide 250 can have dissimilar upper depressions 260 and lower depressions 262 while still providing material between respective outer circumferential surfaces of corresponding ones of drive rolls 180, such as for example when at least one drive roll 180 has at least one channel adapted and configured to allow for guide material clearance.

In alternative embodiments, weld wire 54 is supported and or guided by a plurality of weld wire guides (FIG. 17), e.g. inlet guide 17, intermediate guide 317, and liner guide 318, each of which communicates with the outer circumferential surface of a drive roll 180. A bore extends through each of inlet guide 17, intermediate guide 317, and liner guide 318, respective ones of such bores being generally coaxial to other ones of such bores. Inlet guide 17, intermediate guide 317, and liner guide 318, are respectively housed in inlet guide block 311, intermediate guide block 312, and liner guide block 313, each of which are in turn mounted to carrier plate 128.

A bore extends through each of inlet guide block 311, intermediate guide block 312, and liner guide block 313. An annular cavity extends into each of inlet guide block 311, intermediate guide block 312, and liner guide block 313, generally concentric with each respective bore, and being generally parallel to carrier plate assembly 125 and in line with the desired path of advance of wire 54 (FIG. 5). In preferred embodiments, the annular cavity extending into each of inlet guide block 311, intermediate guide block 312, and liner guide block 313 includes a lip or shoulder adjacent the intersection of the annular cavity and the bore, providing a mechanical stop which longitudinally holds guide respective ones of inlet guide 17, intermediate guide 317, and liner guide 318.

Figure 14:
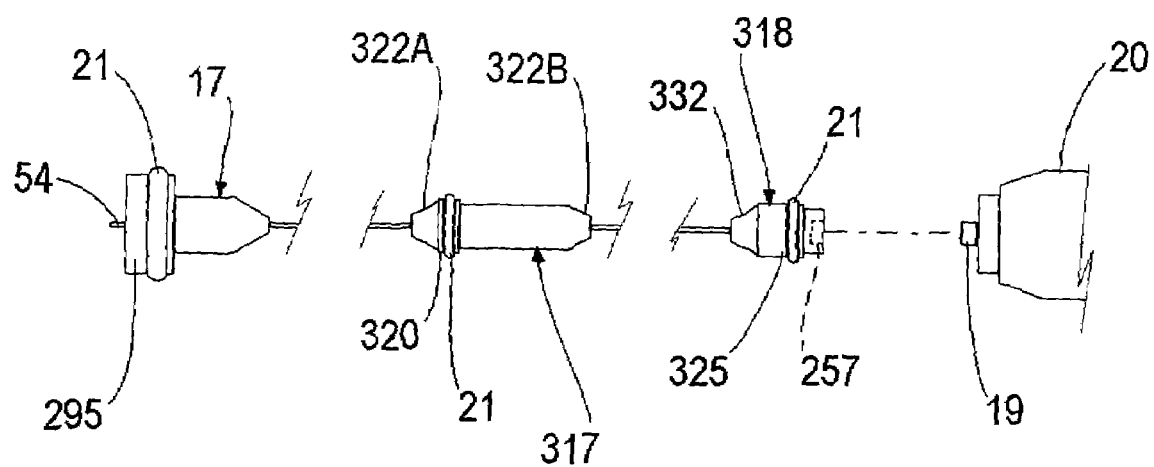
FIG. 14 shows a side elevation view of an inlet guide, an intermediate guide, and a liner guide of the present invention.

In preferred embodiments, a longitudinally outwardly facing surface of each of collars 295, 320, and 325 (FIG. 14) interfaces with the lip or shoulder in the annular cavity of respective ones of inlet guide block 311, intermediate guide block 312, and liner guide block 313, correspondingly longitudinally holding respective ones of inlet guide 17, intermediate guide 317, and liner guide 318.

Intermediate guide 317 (FIGS. 14, and 17) has a first tapered end 322A disposed toward inlet guide 17 and a second tapered end 322B disposed toward power pin 20. Each of first and second tapered ends 322A, 322B has a generally arcuate profile. The contours and radii of the generally arcuate profiles of each of first and second tapered ends 322A, 322B correspond generally to outer circumferential surface characteristics, namely outer body surface 290, of corresponding drive rolls 180 which interface with the generally arcuate profiles.

Collar 320 extends outwardly of the outer surface of intermediate guide 317, away from the longitudinal axis of the intermediate guide, between the first and seconds ends 322A, 322B. O-ring 21 is received into a circumferentially-extending recess configured in the outer surface of intermediate guide 317, e.g. a recess in the collar.

Liner guide 318 has a first, tapered end 332 disposed toward liner 17, and a second end which has a generally circular face and a generally planar profile. A cylindrical end counter bore 257 extends from the second end axially and longitudinally into the liner guide 318. Cylindrical end bore 257 is adapted and configured to accept liner 19 of a welding gun 52.

The first, tapered end 332 of liner guide 318 has a generally arcuate profile. The contours and radii of the generally arcuate profiles of tapered end 332 corresponds generally to the outer circumferential surface characteristics, namely outer body surface 290, of corresponding drive rolls 180 which interface with the respective generally arcuate profile.

Collar 320 extends outwardly of the outer surface of liner guide 318, away from the longitudinal axis of the liner guide, between the first and seconds ends. O-ring 21 is received into a circumferentially-extending recess configured in the outer surface of liner guide 318, e.g. a recess in the collar.

Referring now to FIGS. 15A, 15B, 15C, 15D, and 15E, cover assembly 160A, 160B, 160C generally covers the internal working components of drive assembly 56.

Cover assembly 160A, 160B, 160C generally includes the cover main body 164, lower bracket 161, pressure arm 168A, 168B, 168C, and knob 170A, alternatively handle 170B, 170C. Cover main body 164 includes upwardly extending side panel 165, a lower flange 167, and upper flange 166.

Lower bracket 161 (FIG. 15A) is mounted to isolation plate 124 (FIG. 5) and has first and second apertures 297 on opposing ends of the bracket, axially aligned with each other. Hinge lobes 162 are located at the lower end of lower flange 167 and have apertures 301 which are axially aligned with each other and with apertures 297 in bracket 161. Pivot pins 163 extend through apertures 297 and 301, pivotably mounting cover 164 to bracket 161, and thus pivotably mounting cover 164 to isolation plate 124.

Upper flange 166 extends outwardly from side panel 165 and has at least one seat 300. Each seat comprises a relatively larger diameter blind bore into the top surface of the upper flange, and a relatively smaller diameter and concentric through-bore. Pressure arm 168A, 168B, 168C generally extends along a major portion of upper flange 166 in facing but spaced relationship with upper flange 166. First and second blind bores (not shown) extend upwardly from the lower surface of the pressure arm.

Each of the blind bores in the pressure arm receives a first terminal end of a biasing member e.g. compression spring 172. A second opposite end of the biasing member extends over and generally engages a pressure foot 176, holding the pressure foot against the bottom of the blind bore of the respective seat. Thus, as exemplarily illustrated (FIGS. 15A, 15C, 15E), in the complete assemblage of force converter "FC," ones of the biasing members actuate along a generally straight line of biasing force application, from the biasing member to the drive assembly, exemplarily illustrated as generally upright or vertical. Each pressure foot 176 has a projection which extends through the upper flange at the through bore and interfaces with the respective underlying swingarm 132 when cover assembly 160A is closed over the internal working elements of drive assembly 56.

The loading force of the biasing members, e.g. springs 172, transfers, through the projection of pressure feet 176, to the underlying swingarms 132, from the swingarms 132 to the upper drive rolls 180, and from the upper drive rolls to and through wire 54 to the lower drive rolls, thus pinching weld wire 54 between corresponding ones of the drive rolls 180 which are mounted on swingarms 132 and plate 128 respectively, above and below the respective length of the wire 54 which is engaged by the drive rolls.

In other words, various components of wire feeder 16 collectively define a force converter "FC" which is adapted and configured to, at least in part, confer, bestow, impart, and/or otherwise transmit a force upon drive assembly 56 e.g. swingarm assemblies 130, swing arms 132, drive rolls 180, and/or others, so as to provide a pinch force between respective ones of drive rolls 180, whereby the pinch force between drive rolls 180 enables the rolls to e.g. drive a weld wire.

Force converter "FC" includes, for example, at least some of, (i) pressure arm 168A, B, C, (ii) knob 170A (FIG. 15A) or handle 170B (FIG. 15C), 170C (FIG. 15D), (iii) springs 172, (iv) pressure feet 176, (iv) threaded stem 304A, rotary actuator 304B, or slidable member 304C, and/or (v) other components of wire feeder 16. Ones of the components of force converter "FC," separate or in combination, are adapted and configured to transmit a force therethrough, and/or through other components of force converter "FC," and ultimately to ones of drive rolls 180, which creates a pinch force between respective ones of drive rolls 180.

Figure 15A:
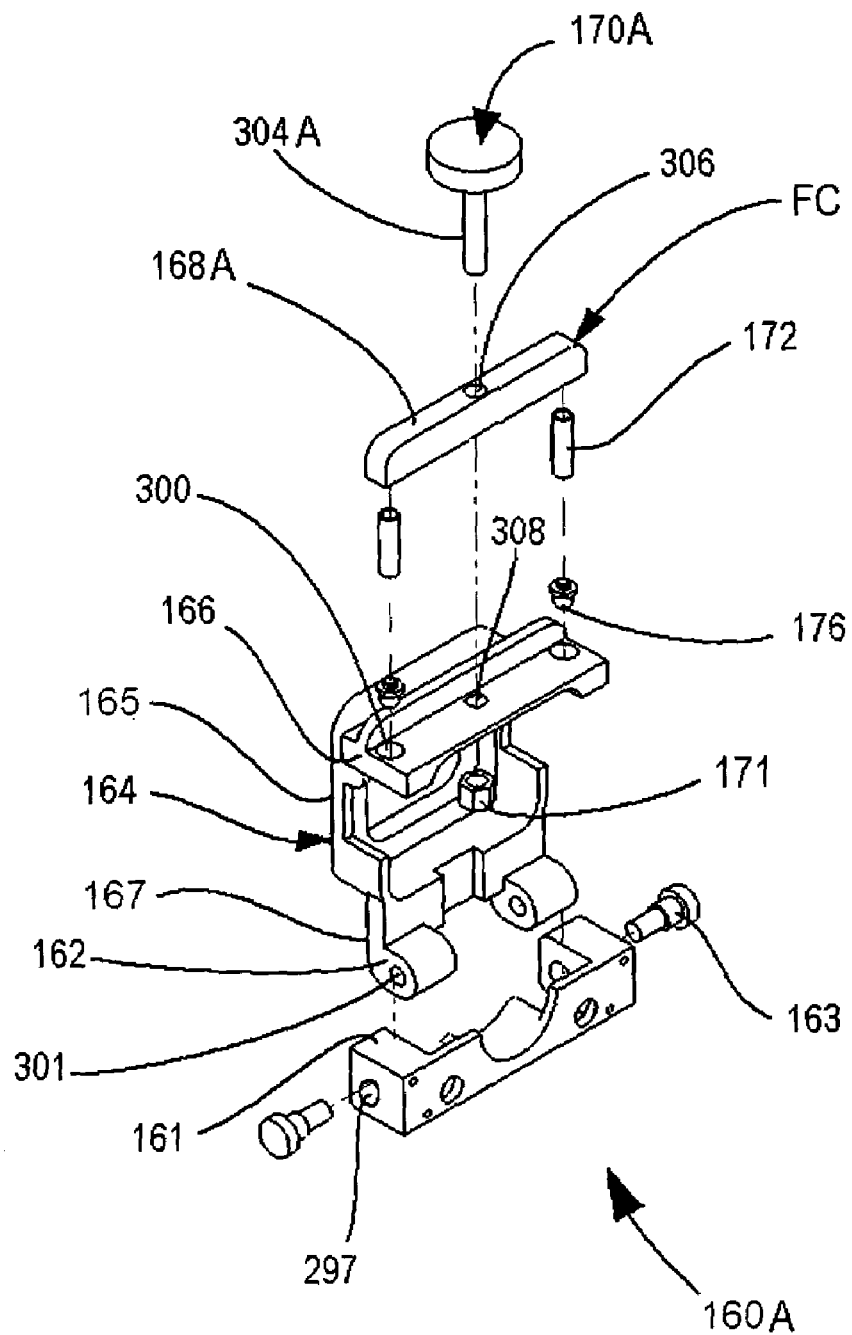
FIG. 15A shows an enlarged exploded view of the cover assembly illustrated in FIG. 5.

In the exemplary embodiments illustrated in FIG. 15A, knob 170A of the cover assembly 160A has, as part of force converter "FC," a threaded elongate projection, e.g. a stem 304, which extends through a bore 306 in a medial section of pressure arm 168A and a bore 308 in a medial section of upper flange 166. The threaded stem of knob 170A is captured by a threaded nut 171 which is fixedly secured to upper flange 166. As an alternative, the stem can be captured by threads in the bore 308 of upper flange 166. Adjusting the relative tightness of knob 170A, e.g. rotating knob 170A, correspondingly adjusts the relative load that springs 172 apply to pressure feet 176.

Figure 15B:
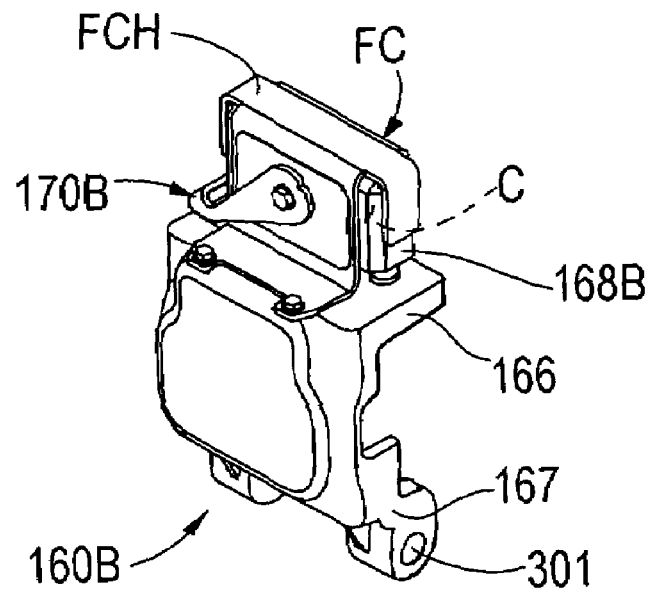
FIG. 15B shows an enlarged perspective view of a second embodiment of cover assemblies of the present invention.

In the exemplary embodiments illustrated in FIG. 15B, the force converter "FC" of cover assembly 160B includes force converter housing "FCH" which houses various components of the force converter. Specifically, force converter housing "FCH" has a housing body which, for example, includes a top wall and a plurality of sidewalls which extend downwardly from the top wall. As illustrated in FIGS. 15B and 15C, at least some of the sidewalls of force converter housing "FCH" are "tab-type" projecting walls (illustrated as the lateral most end/sidewalls), which extend downwardly from the top wall. The inner facing surfaces of the top wall and the sidewalls generally define the outer perimeter of a force converter housing cavity "C." In the complete assemblage of cover assembly 160B, cavity "C" houses various ones of, for example, the moving, e.g. turnable, rotatable, pivotable, slidable, compressible, and/or otherwise articulatable, and/or other non-articulatable, components of force converter "FC" therein.

Flange "F" extends generally perpendicularly away from at least one of the sidewalls, and provides mounting structure for the attachment of e.g. components of force converter "FC" to cover main body 164. As illustrated, a plurality of bores extends generally vertically through flange "F." Flange bolts "FB" extend through the bores of flange "F" and threadedly engage corresponding threaded bores which extend into the upper surface of cover main body 164. Thus, the mechanical interfacing of flange bolts "FB," flange "F," and cover main body 164 attaches force converter "FC" to other components of cover assembly 160B, generally outside of the main body 164.

In addition, force converter "FC" includes pressure arm 168B, handle 170B, and various other components. For example, and with reference to FIG. 15C, other components of force converter "FC" include, but are not limited to, rotary actuator 304B, rotating shaft "RS," and bolts "B."

Figure 15D:
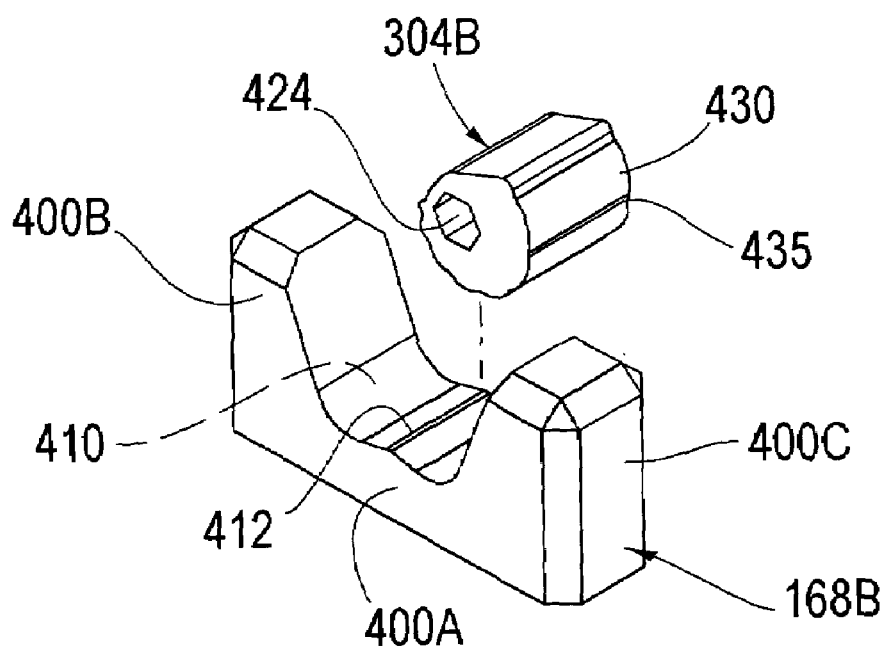
FIG. 15D shows an enlarged exploded view of the pressure arm and rotary actuator of FIG. 15C.
Figure 15C:
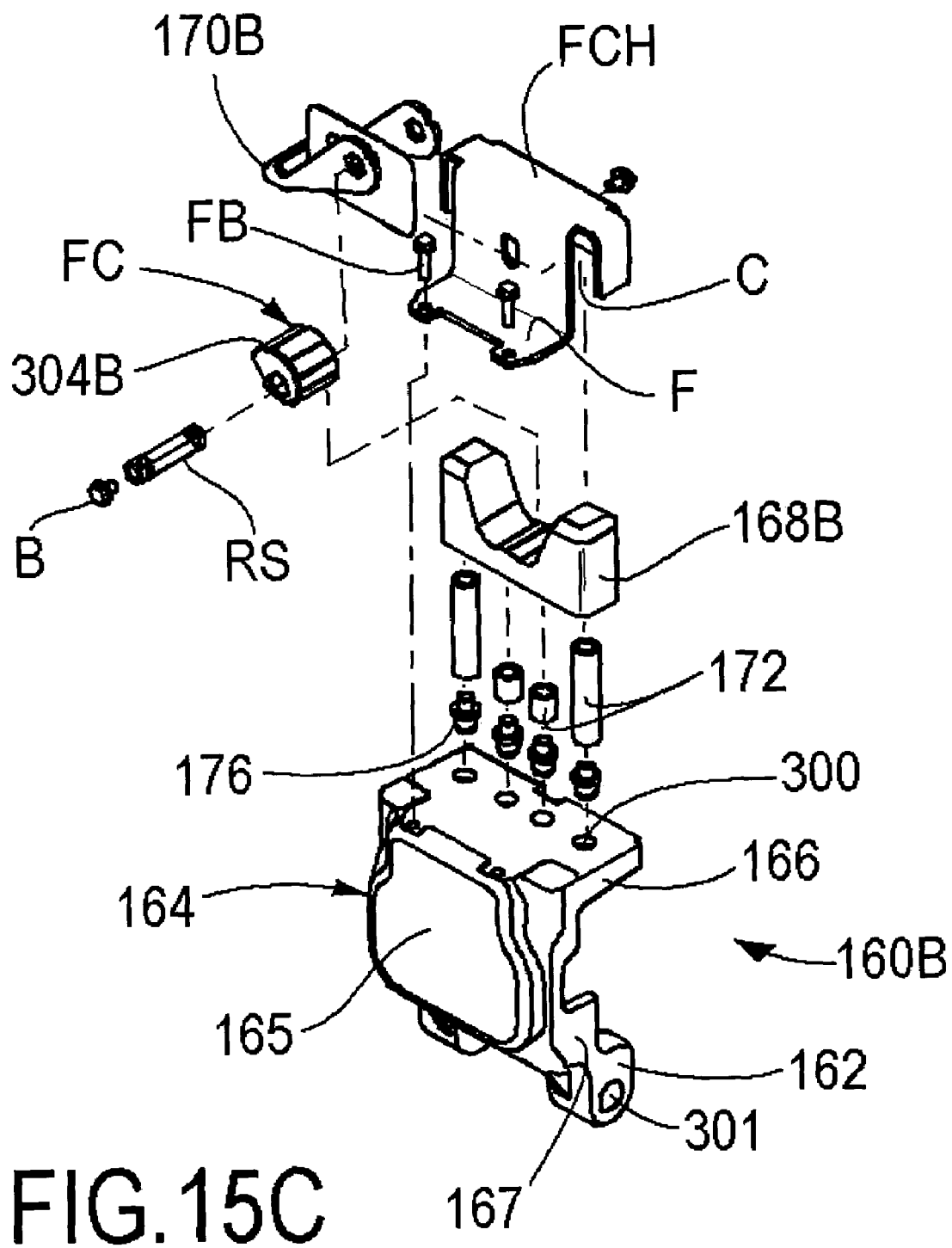
FIG. 15C shows an enlarged exploded view of the cover assembly illustrated in FIG. 15B.

Referring specifically to FIG. 15D, pressure arm 168B is generally "U-shaped," which enables it to rotatably house, and communicate with, rotary actuator 304B. Namely, pressure arm 168B has a bottom wall, e.g. bottom wall 400A, with a generally planar bottom surface, a generally arcuately contoured upper surface, and two ends. End walls 400B and 400C extend upwardly from respective ends of the bottom wall.

The inwardly facing surfaces of end walls 400B and 400C generally define the outer, opposite, generally upwardly extending, perimeter surfaces of pressure plate cavity 410. The upper surface of the bottom wall of pressure arm 168B generally defines a lower, generally horizontally extending, surface of pressure plate cavity 410. Accordingly, the portions of pressure arm 168B which generally face into cavity 410 generally define the outer most perimeter of cavity 410, which is the inner, void, portion of the generally "U-shape" structure defined by pressure arm 168B.

Cavity projection 412 is adapted and configured to interface with rotary actuator 304B, and to selectably hold rotary actuator 304B in a relatively constant position, as desired. As exemplarily illustrated in FIG. 15D, projection 412 extends upwardly from the lower-most portion of the upper surface of bottom wall 400A, and is generally arcuate in profile. However, in some embodiments, projection 412 is a generally linear projection, for example a resilient polymeric and/or elastomeric ridge, which is adapted and configured to interface with corresponding structure of rotary actuator 304B, so as to selectably hold the rotary actuator with respect to the pressure arm. In the alternative, projection 412 can also be a detent, e.g. a projecting catch, dog, or spring-operated ball, which is adapted and configured to interface with corresponding structure of rotary actuator 304B, so as to selectably hold the rotary actuator with respect to the pressure arm.

Rotary actuator 304B extends axially along a major portion of the width dimension of pressure arm 168B, and is adapted and configured to interface with portions of pressure arm 168B. Bore 424 extends axially, and generally off-center, through rotary actuator 304B. The outer circumferential surface of rotary actuator 304B includes a plurality of ramped faces 430 which each generally arcuately rises from and falls toward e.g. bore 424.

Surface depressions 435 extend axially along the outer circumferential surface of rotary actuator 304B, and are generally defined, at the valley-type intersection, between adjacent ones of ramped faces 430. Since bore 424 extends in an off-center path through rotary actuator 304B, the magnitudes of the distances between bore 424 and individual ones of ramped faces 430 differ from each other, as do the magnitudes of the distances between bores 424 and individual ones of surface depressions 435.

Ones of surface depressions 435 are adapted and configured to correspondingly interface with, for example, cavity projection 412. Thus, projection 412 and depressions 435 generally realize a male-female interaction which enables rotary actuator 304B to be selectably held by pressure arm 168B. The particular surface characteristics, angles, radii, and/or other configurations of projection 412, ramped faces 430, and/or surface depressions 435, are selected to enable rotary actuator 304B to be selectably held with a holding force, provided at least in part by the biasing members, which can be overcome, e.g. released, by a force applied by a user, as desired by the user.

Since the distances between bore 424 and individual ones of ramped faces 430 differ from each other, as do the distances between bore 424 and individual ones of surface depressions 435, the distance between pressure arm 168B and cover 164 is variable. The particular distance between pressure arm 168B and cover 164, at any given time, depends on which particular one of the surface depressions 435 interfaces with the cavity projection 412 at that particular time. Thus, pressure arm 168B can be relatively nearer to, or relatively further from, cover 164 depending on the rotational position, e.g. which depression faces downwardly, of rotary actuator 304B, whereby force converter "FC" realizes a relatively greater, or relatively lesser, magnitude of exerted force, respectively.

In some embodiments, the projections extend from rotary actuator 304B, and the depression(s) extend into pressure arm 168B. In these embodiments, the interfacing and interaction between the projections and depression(s) still enable rotary actuator 304B to be selectably held with a holding force which can be overcome, e.g. released, by a force applied by a user, as desired by the user.

Referring now to FIGS. 15C, and 15D, rotating shaft "RS" has first and second terminal ends, each having a threaded bore which extends axially thereinto, and a length defined therebetween. The outer perimeter of the outer surface of rotating shaft "RS" is adapted and configured to mechanically interface with the inner perimeter of the inner surface of bore 424, whereby rotating shaft "RS" and rotary actuator 304B are mechanically locked in, e.g. rotational unison. As exemplarily illustrated, bore 424 defines a polygonal bore perimeter and rotating shaft "RS" defines a corresponding polygonal outer circumferential surface. However, other interfacing structures, suitable for use in rotating shaft "RS" and bore 424 are contemplated. Such other suitable structures include, but are not limited to, splined interfaces, keyways and corresponding keys, setscrews, and others.

In the complete assemblage of force converter "FC," at least part of each of the first and second terminal ends of rotating shaft "RS" extend outwardly beyond rotary actuator 304B. The portions of rotating shaft "RS" which extend beyond the actuator interface with handle 170B. In particular, handle 170B has first and second arms which extend outwardly from the remainder of the handle.

Each of the first and second arms of handle 170B has a bore which extends therethrough and is adapted and configured to interface with rotating shaft "RS," whereby handle 170B and rotary actuator 304B are locked in rotational unison via the rotating shaft. Thus, handle 170B interfaces with rotating shaft "RS" in the same way that rotary actuator 304B interfaces with rotating shaft "RS," only at different respective portions of the outer perimeter of the outer surface of rotating shaft "RS." Each of bolts "B" threadedly inserts into and engages a respective threaded bore which extends axially into the terminal ends of rotating shaft "RS," and fixedly attaches the handle to the shaft.

Accordingly, the assemblage of handle 170B, rotating shaft "RS," and rotary actuator 304B, generally rotates as one unitary body. Therefore, as a user pivots and/or rotates handle 170B, about an axis of rotation which extends axially through rotating shaft "RS," the user correspondingly pivots and/or rotates rotary actuator 304B about the same axis of rotation.

Springs 172 can have pre-selected spring constants and/or tensions which correspond relatively closely to the desired loading force to be applied to pressure feet 176 e.g. spring loading force, thereby reducing the amount of adjusting of the relative tightness of knob 170A (or handle 170B, 170C) to achieve the desired loading force to be applied by springs 172 to pressure feet 176. The effective spring constant of springs 172, collectively, can have relatively different magnitudes at relatively different levels of spring compression. Thus, at relatively lower levels of spring compression, the spring constant is relatively lesser in magnitude, while at relatively higher levels of spring compression the spring constant is relatively greater in magnitude, e.g. springs 172, collectively, have a progressive spring rate and/or spring constant.

Alternatively, the spring constants and/or tensions can be pre-selected closely enough to the desired loading force to generally eliminate the need for adjusting the relative tightness of knob 170A (or handle 170B, 170C) and thereby generally reducing, alternatively eliminating, the need for knob 170A (or handle 170B, 170C). In such scenario, spring tension can be adjusted by replacing springs 172 with springs having different spring constants and/or tensions, e.g. relatively greater spring tensions or relatively lesser spring tensions, as desired.

The biasing members, such as ones of springs 172, can be of different lengths (FIGS. 15C, 15E) and/or have different spring constants. For example, and referring to FIG. 15C, the relatively shorter springs, which are located inwardly of the relatively long springs, can each have a greater, or lesser, spring constant relative to the spring constant of each of the relatively longer springs. In such embodiments, the relatively shorter springs, with the e.g. greater spring constants, provide a relatively greater pressure force upon pressure feet 176 than the relatively longer springs, per the same magnitude of length of compression of the springs.

The biasing members can include, in addition to, or in lieu of, compression springs, other structures and materials suitable for biasing pressure arm 168A, 168B, 168C. Such suitable other biasing structures and materials include, but are not limited to, resilient and/or elastomeric materials and compounds such as various urethanes, natural rubbers, synthetic rubbers, and/or others.

Referring now to the exemplary embodiments of FIG. 15E, force converter "FC" can include pressure arm 168C, slidable member 304C, and handle 170C. Pressure arm 168C is generally wedge shaped and has an angled, and/or ramped, upper surface which can include engagement structure 268. Engagement structure 268 is adapted and configured to frictionally, mechanically, and/or otherwise engage, slidable member 304C. Engagement structure 268 can be knurling, projections, recesses/depressions, and/or other structure, effective to mechanically and/or otherwise hold slidable member 304C in a generally constant position with respect to pressure arm 168C, as desired.

Slidable member 304C is generally wedge shaped and has an angled, and/or ramped, lower surface which can also include engagement structure (not illustrated) adapted and configured to interface with engagement structure 268, and/or other portions of pressure arm 168C. Like engagement structure 268, the engagement structure of slidable member 304C can be knurling, projections, recesses/depressions, and/or other structure, effective to mechanically and/or otherwise hold slidable member 304C in a generally constant position with respect to pressure arm 168C, as desired. A threaded bore extends into the upper surface of slidable member 304C and enables e.g. handle 170C to be attached thereto.

Handle 170C has a handle body with a lowermost surface. Threaded stem "S" extends downwardly from the lowermost surface of handle 170C. A slot, namely slot "SL" defines a slot length and a slot width and extends through, and along at least part of the length of, the upper wall of force converter housing "FCH." The magnitude of the slot width dimension is greater than the magnitude of the diameter of threaded stem "S," whereby threaded stem "S" extends through slot "SL" and is slidingly housed therein. Threaded stem "S" is threadedly held by threaded bore 305 in slidable member 304C, which enables a user to slide handle 170C, and thus slidable member 304C, along the length of slot "SL."

As further illustrated in FIG. 15E, force converter housing "FCH" can be generally devoid of at least some of the "tab-type" downwardly projecting sidewalls, such as those illustrated in FIG. 15B, 15C. Slidable member 304C can thus slide outwardly beyond the outer perimeter of force converter housing "FCH," as permitted by the cooperation of stem "S" of handle 170C and slot "SL" of force converter housing "FCH." When a user slides handle 170C, for example, in a direction along the length of slot "SL," the user correspondingly slides slidable member 304C in the same direction, and a distance of a corresponding magnitude as that of the distance traveled by handle 170C.

Since each of pressure arm 168C and slidable member 304C realize a wedge shaped configuration, each defines a relatively thicker portion thereof. Also, since slidable member 304C is laterally e.g. horizontally movable, and since pressure arm 168C is vertically movable, when the thicker portions of the pressure arm and the slidable member are relatively closer to each other, pressure arm 168C is "wedged" downwardly, and linearly travels, relatively nearer cover 164.

Correspondingly, when the thicker portions of the pressure arm and the slidable member are relatively more distal each other, pressure arm 168C is relatively more distal cover 164. Thus, pressure arm 168C can be relatively nearer to, or relatively further from, cover 164 depending on the lateral position of slidable member 304C, whereby force converter "FC" realizes a relatively greater, or relatively lesser, magnitude of exerted force, respectively.

A drive assembly 56 of the present invention, with cover 164 closed over e.g. drive rolls 180, is shown in cross-sectional view in FIG. 16. Referring to FIGS. 13E and 16, corresponding pairs of drive rolls 180 interface with upper depression 260 and lower depression 262, respectively, of wire guide 250 and communicate with each other individually at apertures 265, through their collective grip on weld wire 54.

Drive rolls 180 can further communicate with each other directly, at laterally displaced, facing ones of rims 246 when no wire 54 is present in groove 294. Thus, where a weld wire 54 is disposed in a groove 294, the pressure imposed by springs 172 passes through swingarm 132 such that the groove 294 in the upper drive roll 180, on the swingarm, presses against the weld wire, through aperture 265, thus applying sufficient force between the upper and lower drive rolls 180 that the driving force, applied by the rotationally-driven lower drive rolls, is effective to drive the weld wire 54 through the drive assembly, through liner 19 and to the contact tip of a gun 52. In such scenario, the lower drive roll is acting on the weld wire 54 through the same aperture 265.

Where no wire is present in a groove 294, and where the distance D4 is greater than the distance D3, the force of spring 172 brings the rim(s) 246 of an upper drive roll into contact with the corresponding rim(s) of a respective lower drive roll, such that the downward movement of swingarm 132 is stopped by the cooperating rims 246 before there is any contact between the grooves 294 in the upper and lower rolls. By thus avoiding contact between the grooves, even when no wire 54 is present, such as when the wire on a spindle 46 has run out, any potential damage to e.g. the upper edges of such grooves, top of the groove, which might occur as a result of such contact, is avoided. Here, again, rims 246 operate in a protective role to protect grooves 294 from inadvertent e.g. damage or deformation beyond the ordinary wear and tear of driving the weld wire. Rims 246 can have a planar outer surface, as illustrated in the drawings, where facing rims meet each other. In the alternative, the meeting outer surfaces of the rims can be arcuate, such that, in either case, the rims do not contact each other with sharp points which could damage either or both of the rims.

The base body surface BBS can be designed with multiple radii dimensions at the bottoms of the respective e.g. three channels 302 between grooves 294, and between grooves 294 and rims 246 (FIGS. 12B and 12C). FIG. 12C illustrates the interfacial cooperation between the side walls of channels 302 and corresponding side walls of apertures 265. As seen therein, side walls of aperture 265 are in close proximity, and are laterally adjacent the side walls of channels 302. Thus, the side walls of the channels prevent substantial lateral movement of the wire guide at the drive rolls, whereby the drive rolls stabilize the wire guide against lateral movement with respect to the drive rolls. While the drive rolls are thus configured to interface with the wire guide 250, the relative dimensions of the wire guide and the drive rolls are such that the wire guide is loosely held in place, so as to provide clearance between the drive rolls and respective portions of wire guide 250 e.g. ridges 299, without incurring so much friction between the wire guide and the drive rolls as to cause binding of the wire guide relative to the drive rolls.

As with the dimensions BD and DAG, when the base body surface comprehends multiple radii dimensions, channel to channel, the dimensions D2, D3, and D4 are then preferably measured either as diameters, or as radii from the axis of rotation 310 of drive roll 180, rather than from the base body surface at a respective channel 302.

In ordinary use of force converter "FC," the force convert is adapted and configured to vary its force output either continuously, or discretely. As one example of a continuously variable force converter "FC," a user of cover assembly 160A converts a generally rotational force into a generally linear force. To do this, the user rotates knob 170A thus advancing the knob into the holding threads, and thereby moving pressure arm 168A toward flange 166, which increases the load that springs 172 apply through pressure feet 176 and swingarms 132, thereby increasing the pinching force that drive rolls 180 apply to weld wire 54.

The user can rotate knob 170A in the opposite direction, thus to enable springs 172 to push pressure arm 168A respectively further away from flange 166, thereby decreasing the spring force being applied, and correspondingly decreasing the load that springs 172 apply through pressure feet 176 and swingarms 132, which decreases the pinching force that drive rolls 180 apply to weld wire 54.

As another example of a continuously variable force converter "FC," cover assembly 160B can include a rotary actuator with a relatively smooth outer circumferential surface, which enables the user to convert a generally rotational force into a generally linear force. The user rotates and/or pivots handle 170B thus rotatably advancing the rotary actuator within the cavity 410, and thereby moving pressure arm 168B toward flange 166, which increases the load that springs 172 apply through pressure feet 176 and swingarms 132, thereby increasing the pinching force that drive rolls 180 apply to weld wire 54.

The user can rotate and/or pivot handle 170B in the opposite direction, thus to enable springs 172 to push pressure arm 168B respectively further away from flange 166, thereby decreasing the spring force being applied, and correspondingly decreasing the load that springs 172 apply through pressure feet 176 and swingarms 132, which decreases the pinching force that drive rolls 180 apply to weld wire 54.

In some embodiments, such as the exemplary embodiments of FIGS. 15C and 15D, cover assembly 160B includes a discretely variable force converter "FC." In such embodiments, rotary actuator 304B includes ramped faces 430 and surface depressions 435, and pressure foot 168B includes cavity projection 412. Thus, as the user manipulates handle 170B, discrete positions are realized when individual ones of surface depressions 435 align and interface with cavity projection 412.

As yet another example of a continuously variable force converter "FC," cover assembly 160C can include pressure arm 168C and slidable member 304C, neither of which includes engagement structure 268. This enables pressure arm 168C and slidable member 304C to generally smoothly slidingly engage each other, and further enables the force converter "FC" to convert a-generally linearly actuated force applied in a first, e.g. horizontal, direction to a generally linearly actuated force applied in a second, e.g. vertical, direction which is generally perpendicular to the first direction.

The user slides handle 170C, along the length of slot "SL," thus linearly advancing the slidable member 304C, and thereby moving pressure arm 168C toward flange 166, which increases the load that springs 172 apply through pressure feet 176 and swingarms 132, thereby increasing the pinching force that drive rolls 180 apply to weld wire 54. The user can slide handle 170C in the opposite direction, thus to enable springs 172 to push pressure arm 168C respectively further away from flange 166, thereby decreasing the spring force being applied, and correspondingly decreasing the load that springs 172 apply through pressure feet 176 and swingarms 132, which decreases the pinching force that drive rolls 180 apply to weld wire 54.

In some embodiments, such as the exemplary embodiments of FIG. 15E, cover assembly 160C includes a discretely variable force converter "FC." In such embodiments, at least one of pressure arm 168C and slidable member 304C includes engagement structure 268. Thus, as the user manipulates handle 170C, discrete positions are realized when individual ones of engagement structure 268 align and interface other ones of engagement structure 268 on pressure arm 168C and/or slidable member 304C.

Drive assemblies 56 of the invention are used by first determining which weld wire 54 is suitable for the welding application and subsequently selecting suitable drive rolls 180 which have e.g. grooves 294 which are compatible with the weld wire.

As desired, a user can change/replace drive rolls 180 to correspond with the current welding task. First, the user selects suitable drive rolls based, at least in part, on the type and/or size of weld wire 54 to be used in the welding process.

In an assembly wherein a drive roll 180 is assembled to e.g. a swingarm 132, or to plate 128, one of the sides 238, 239 of the drive roll is proximate, and in facing relationship with, surface 223A of base plate 221 of body 220, which is part of carrier 140. In such assembly, spring 225 is urging button 230 away from base plate 221 of body 220. At the same time, compression ring 235 is urging ball bearings 237 outwardly through apertures 233 and into confining slots 222. Accordingly, spring 225 pushes the button, and thus ball bearings, away from the base plate while compression ring 235 pushes the ball bearings into slots 222. Under that set of forces, the force of spring 225 moves button 230 outwardly, away from base plate 221, until the ball bearings reach the distal ends of slots 222, whereupon the abutment of ball bearings against the ends of the slots prevents further outwards movement of the button, whereby assembly of the drive roll of swingarm 132 or plate 128 is complete.

The distal ends of slots 222 are so positioned, relative to base plate 221, that in the fully assembled condition, wherein ball bearings 237 are abutting the distal ends of slots 222, the ball bearings 237 are positioned generally further away from base plate 221 than the respective distal side 238, 239 of the drive roll. Specifically, a respective ball bearing is abutting the distal slot end, relative to base plate 221, and is in engaging contact with, and extends a bit over, the respective side 238, 239 of the drive roll, at bore 240. Such relationships, wherein the drive roll is assembled to carrier 140, are illustrated in FIGS. 9 and 16.

Thus, ball bearings 237 serve both to limit and/or stop the outward movement of button 230 at the end of slot 222, and to hold the drive roll firmly mounted to the respective swingarm 132 on plate 128 by abutting the side 238, 239 of the drive roll. Meantime, lugs 228 on the body are received in slots 242 on the drive roll, whereby rotation of carrier 140 by the respective carrier pinion 138 causes rotation of the respective drive roll 180, thus to drive weld wire 54 when the cover assembly 160A is closed on the drive assembly.

To remove a drive roll from the drive assembly, the user presses button 230 firmly inwardly into body 220 against the collective resisting forces of spring 225 and compression spring/ring 235, plus the initial resistance imposed by ball bearings 237. Such movement of button 230 requires retraction of the extension of the ball bearings 237 over the sides 238, 239 of the drive roll. Namely, the force exerted by button 230 on the ball bearings at apertures 233 applies forces, at the contacts of the bearings with bore 240 of the drive roll, which force the bearings to move in an inward direction into the button, against the outwardly-directed force of compression ring 235. Such movement of the bearings brings the bearings 237 completely inside bore 240 such that the drive roll is released from the immobilizing force of the bearings on the drive roll. However, the force of compression ring 235 still pushes bearings 237 outwardly against the inner surface of bore 240.

Once the bearings are thus fully retracted, and are pressing against the inner surface of the bore, the outwardly-directed force of the bearings brings the bearings into modest frictional engagement with the inner surface of bore 240. Thus, any movement of the bearings along the line of direction of movement of the button 230 applies a corresponding modest force, in the same direction to the drive roll.

As the button is pushed inwardly, toward base plate 221, the drive roll cannot move because of being adjacent base plate 221. However, once button 230 is released, and begins moving back away from base plate 221, under the restorative force of spring 225, compression ring 235 continues to bias ball bearings 237 against the inner surface of bore 240. The frictional forces between ball bearings 237 and the inner surface of bore 240 are sufficiently great that drive roll 180 is carried outwardly away from base plate 221 with button 230, whereupon the drive roll is delivered for facile removal removed from carrier 140.

Thus, pressing and releasing button 230 both releases the drive roll, and moves the drive roll outwardly on carrier 140, for facile removal by the user.

To install a suitable drive roll 180, the user aligns through slots 242 of a drive roll 180 with corresponding lugs 228 of a carrier 140. The user then pushes the drive roll onto the carrier. As the drive roll is pushed onto the carrier body 220, the respective side 238, 239, at bore 240 pushes against the ball bearings 237 in slots 222, thus pushing the ball bearings toward base plate 221, carrying button 230 along. When the proximal edge of button 230 abuts 221, the button stops moving. Upon further pushing of the drive roll toward base plate 221, the respective side 238, 239 of the drive roll, at bore 240, pushes the ball bearings inwardly against compression ring 235, whereupon the drive roll advances into close proximity to surface 223A of the base plate, while bearings 237 are pressed against the inner surface of bore 240 by compression spring/ring 235.

In that condition, the retractive force of spring 225 is sufficient to move the button, and ball bearings 237 with it, away from base plate 221, whereby ball bearings 237 move outward along slots 222 until the bearings abut the distal ends of the slots. In that condition, the bearings are disposed generally outwardly of the drive roll, as indicated above, and also extend a bit over the respective sides of the drive roll, thereby capturing the drive roll between the bearings and the base plate.

The user then adjusts drive roll pressure by turning, e.g. tightening or loosening knob 170A. Preferably, the user adjusts drive roll pressure to a pressure level which applies sufficient pressure to drive weld wire 54 through the wire feeder assembly 16 without undesired levels of wire slippage, while not applying so much pressure that drive rolls 180 unnecessarily deform weld wire 54.

Preferably, drive assembly 56 is made of materials which resist corrosion, and are suitably strong and durable for normal extended use. Those skilled in the art are well aware of certain metallic and non-metallic materials which possess such desirable qualities, and appropriate methods of forming such materials.

Appropriate metallic materials for components of drive assembly 56 include, but are not limited to, aluminum, steel, stainless steel, titanium, magnesium, brass, and their respective alloys. Common industry methods of forming such metallic materials include casting, forging, shearing, bending, machining, riveting, welding, powdered metal processing, extruding and others.

Non-metallic materials suitable for components of drive assembly 56, e.g. inlet guide 17, isolation plate 124, spacer blocks 126, parts of knobs 150 and 170A, wire guide 250, and others, are various polymeric compounds, such as for example and without limitation, various of the polyolefins, such as a variety of the polyethylenes, e.g. high density polyethylene, or polypropylenes. There can also be mentioned as examples such polymers as polyvinyl chloride and chlorinated polyvinyl chloride copolymers, various of the polyamides, polycarbonates, and others.

For any polymeric material employed in structures of the invention, any conventional additive package can be included such as, for example and without limitation, slip agents, anti-block agents, release agents, anti-oxidants, fillers, and plasticizers, to control e.g. processing of the polymeric material as well as to stabilize and/or otherwise control the properties of the finished processed product, also to control hardness, bending resistance, and the like.

Common industry methods of forming such polymeric compounds will suffice to form non-metallic components of drive assembly 56. Exemplary, but not limiting, of such processes are the various commonly-known plastics converting processes.

Drive assembly 56 is preferably manufactured as individual components, and the individual components assembled as sub-assemblies, including but not limited to motor 102 and components attached thereto e.g. gearbox 112, drive pinion 122, and isolation plate 124; carrier plate assembly 125; swingarm assemblies 130; and cover assembly 160A. Each of the aforementioned sub-assemblies is then assembled to respective other ones of the sub-assemblies to develop drive assembly 56. Those skilled in the art are well aware of certain joinder technologies and hardware suitable for the assembly of drive assembly 56.

Finally, in preferred embodiments, the modularity of drive assembly 56, and the structure of each of its components, facilitate manufacture, service and repair of the drive assembly. In preferred embodiments, isolation plate 124, carrier assembly 125, swingarm assemblies 130, and cover assembly 160A are symmetrical, making them suitable for installation as components of drive assembly 56 whether mounted to, e.g. either a left or a right side of control box 48 (FIG. 1).

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A wire pinch force mechanism, comprising:
   (a) a drive assembly defining a length dimension that is parallel to a direction of wire conveyance through the drive assembly, the drive assembly including first and second drive rolls mounted to first and second drive roll carriers, wherein the first and second drive roll carriers longitudinally pivot away from each other along the length of the drive assembly;
   (b) a cover movable between a first open position and a second closed position; and
   (c) a force converter mounted to the cover and applying a force to the drive assembly for enabling a user to increase or decrease an amount of force being applied to the drive assembly.

2. A wire pinch force mechanism as in claim 1, said force converter being adapted and configured to convert a rotational force into a linear force.

3. A wire pinch force mechanism as in claim 2, said force-converter further comprising a threaded stem which converts a rotational force into a linearforce.

4. A wire pinch force mechanism as in claim 2, said force converter further comprising a rotary actuator which converts a rotational force into a linear force.

5. A wire pinch force mechanism as in claim 1, said force converter being adapted and configured to convert a linearly actuated force applied in a first force direction to a linearly actuated force applied in a second force direction, said first and second force directions being perpendicular with respect to each other.

6. A wire pinch force mechanism as in claim 5, said force converter further comprising a slidable member which, at least in part, converts said first force direction into said second force direction.

7. A wire pinch force mechanism as in claim 1, said force converter being adapted and configured to apply a continuously variable force to said drive assembly.

8. A wire pinch force mechanism as in claim 1, said force converter being adapted and configured to apply a discretely variable force, at discrete force increments, to said drive assembly.

9. A wire pinch force mechanism as in claim 1, said cover being adapted and configured to pivot between a first open position and a second closed position.

10. A welding system comprising a wire feeder apparatus having a wire pinch force mechanism as in claim 1.

11. A wire pinch force mechanism, comprising:
    (a) a drive assembly including a drive roll mounted to a swingarm defining a lengththereof;
    (b) a cover movable between a first open position and a second closed position; and
    (c) a force converter mounted to the cover, wherein the force converter applies multiple forces to the swingarm at multiple discrete locations along the length of the swingarm.

* * * * *